United States Patent
Suzuki

(10) Patent No.: US 9,978,128 B2
(45) Date of Patent: May 22, 2018

(54) IMAGE PROCESSING APPARTATUS AND METHOD, RECORDING MEDIUM STORING IMAGE PROCESSING PROGRAM READABLE BY COMPUTER, AND IMAGING APPARATUS

(71) Applicant: OLYMPUS CORPORATION, Hachioji-shi, Tokyo (JP)

(72) Inventor: Hiroshi Suzuki, Hino (JP)

(73) Assignee: Olympus Corporation, Tokyo (JP)

( * ) Notice: Subject to any disclaimer, the term of this patent is extended or adjusted under 35 U.S.C. 154(b) by 2 days.

(21) Appl. No.: 15/284,631

(22) Filed: Oct. 4, 2016

(65) Prior Publication Data

US 2017/0024865 A1    Jan. 26, 2017

Related U.S. Application Data

(63) Continuation of application No. PCT/JP2015/054816, filed on Feb. 20, 2015.

(30) Foreign Application Priority Data

Apr. 7, 2014   (JP) ................. 2014-078922

(51) Int. Cl.
  *G06K 9/00* (2006.01)
  *G06T 5/00* (2006.01)
  (Continued)

(52) U.S. Cl.
  CPC ............ *G06T 5/005* (2013.01); *G06T 5/00* (2013.01); *G06T 5/40* (2013.01); *H04N 1/407* (2013.01);
  (Continued)

(58) Field of Classification Search
  CPC . G06T 2207/10024; G06T 5/00; G06T 5/005; G06T 5/40; H04N 1/407; H04N 5/232
  See application file for complete search history.

(56) References Cited

U.S. PATENT DOCUMENTS

| | | | |
|---|---|---|---|
| 2002/0061142 A1 | 5/2002 | Hiramatsu | |
| 2005/0012947 A1 | 1/2005 | Ohkawa | |

(Continued)

FOREIGN PATENT DOCUMENTS

| | | |
|---|---|---|
| JP | 2002-281312 | 9/2002 |
| JP | 2009-071768 | 4/2009 |

(Continued)

OTHER PUBLICATIONS

Translation of International Preliminary Report on Patentability to corresponding International Patent Application No. PCT/JP2015/054816, dated Oct. 20, 2016 (7 pgs).

(Continued)

*Primary Examiner* — Phuoc Tran
(74) *Attorney, Agent, or Firm* — John C. Pokotylo; Pokotylo Patent Services

(57) ABSTRACT

An image processing apparatus includes a degree-of-degradation detector, a degree-of-degradation estimation unit, a correction system selector and a gradation correction unit. The degree-of-degradation detector detects a degree of degradation of an image data. The degree-of-degradation estimation unit estimates a dispersion of the degree of degradation in the image data. The correction system selector selects either a first gradation correction system or a second gradation correction system in accordance with the dispersion of the degree of degradation. The gradation correction unit performs gradation correction of the image data based on either the selected first or second gradation correction system.

12 Claims, 19 Drawing Sheets

(51) Int. Cl.
  *H04N 1/407*  (2006.01)
  *H04N 5/232*  (2006.01)
  *G06T 5/40*  (2006.01)
(52) U.S. Cl.
  CPC ... *H04N 5/232* (2013.01); *G06T 2207/10024* (2013.01)

(56) References Cited

U.S. PATENT DOCUMENTS

| | | |
|---|---|---|
| 2010/0303355 A1 | 12/2010 | Ikeda |
| 2010/0329559 A1* | 12/2010 | Shindo .................... G06T 5/009 382/172 |
| 2015/0243002 A1* | 8/2015 | Hirooka ................. G06T 5/008 348/241 |

FOREIGN PATENT DOCUMENTS

| JP | 2010-152536 | 7/2010 |
|---|---|---|
| JP | 2012-054659 | 3/2012 |

OTHER PUBLICATIONS

International Search Report to corresponding International Patent Application No. PCT/JP2015/054816, dated Apr. 21, 2015 (3 pgs), with translation (2 pgs.).
Written Opinion of the International Search Authority to corresponding International Patent Application No. PCT/JP2015/054816 (4 pgs.).
Partial Supplementary European Search Report to corresponding European Application No. 15776404.4, dated Dec. 14, 2017 (18 pgs.), with cover sheet (2 pgs.).
Kaiming He et al, "Single Image Haze Removal Using Dark Channel Prior" *IEEE Transactions on Pattern Analysis and Machine Intelligence*; vol. 33. No. 12, pp. 2341-2353 (Dec. 1, 2011).
Extended European Search Report to corresponding European Patent Application No. 15776404.4, dated Mar. 21, 2018 (15pgs.), with cover sheet (1pg.).

* cited by examiner

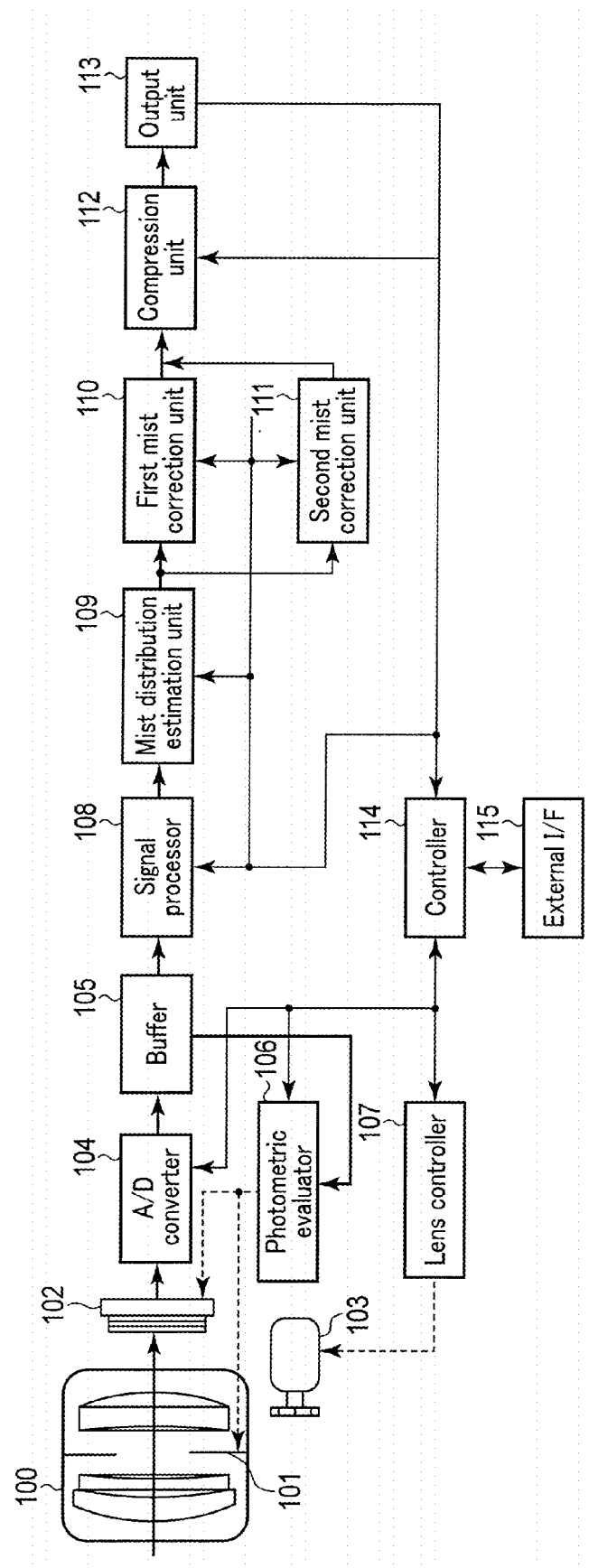
F I G. 1

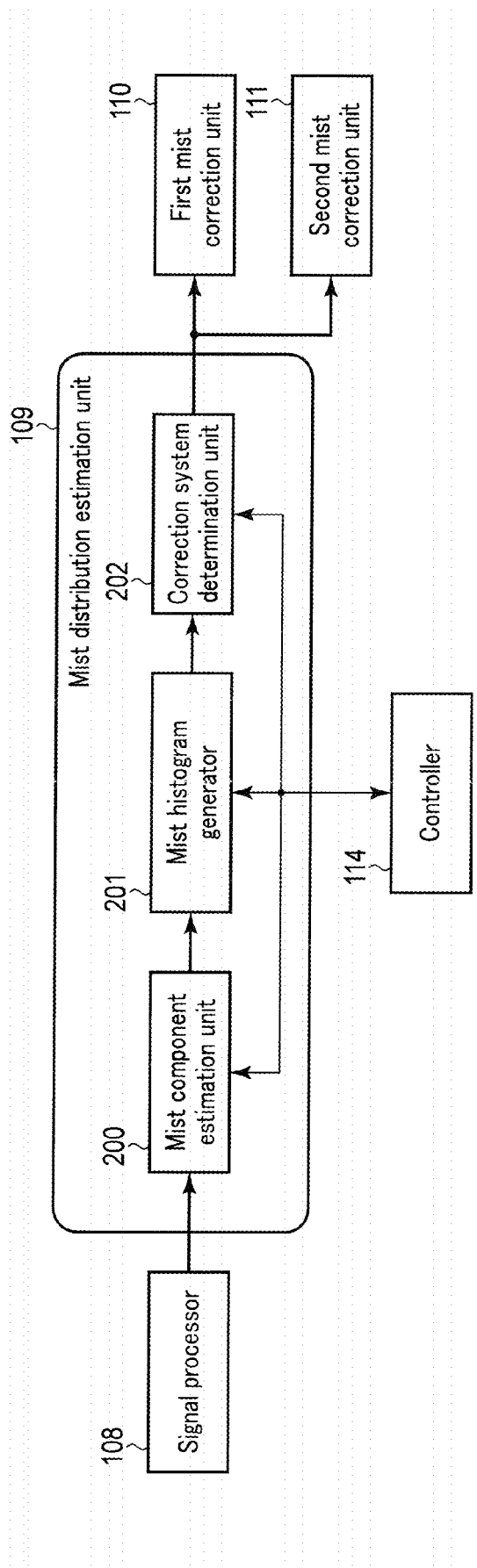
F I G. 2

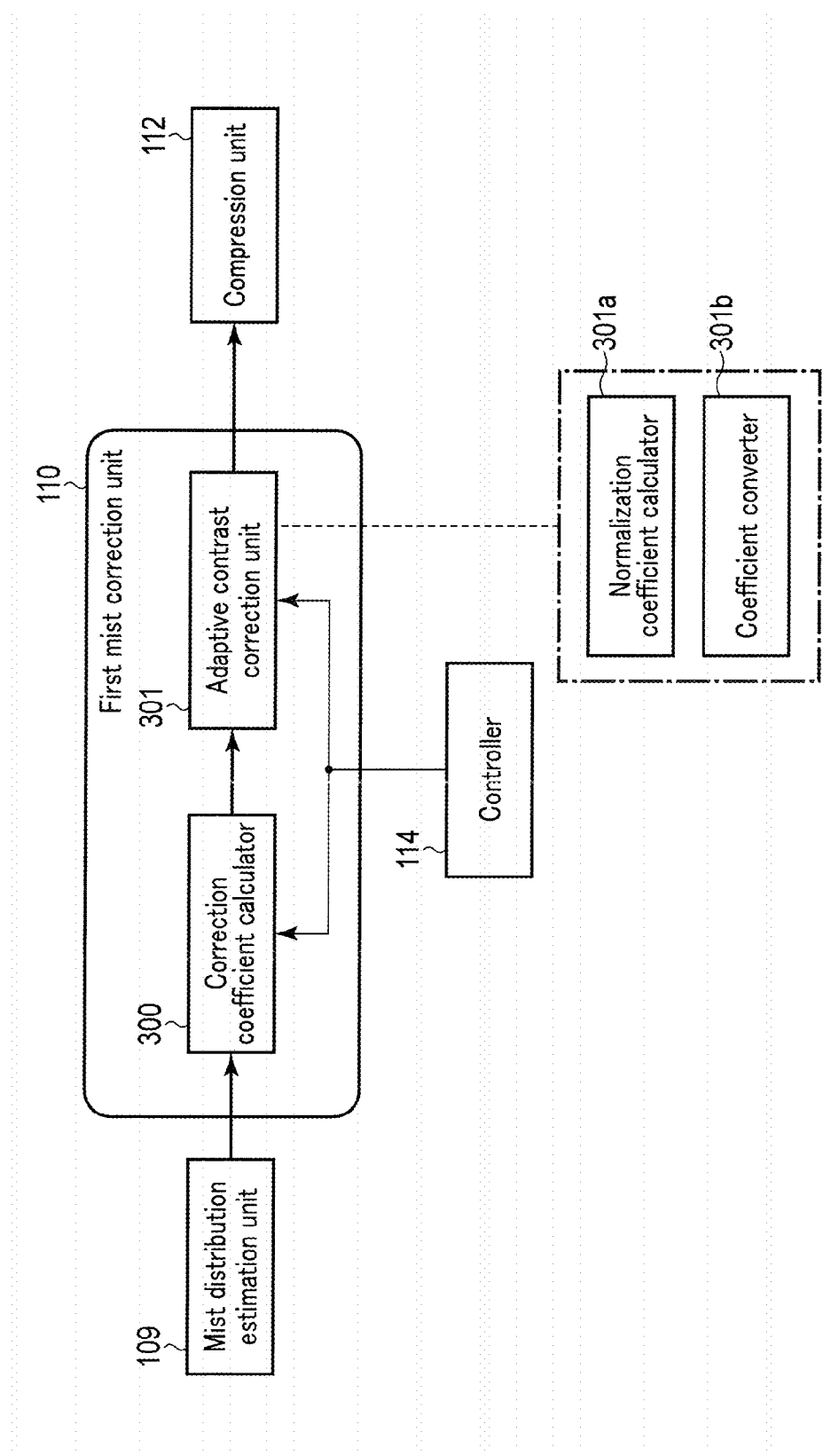
F I G. 5

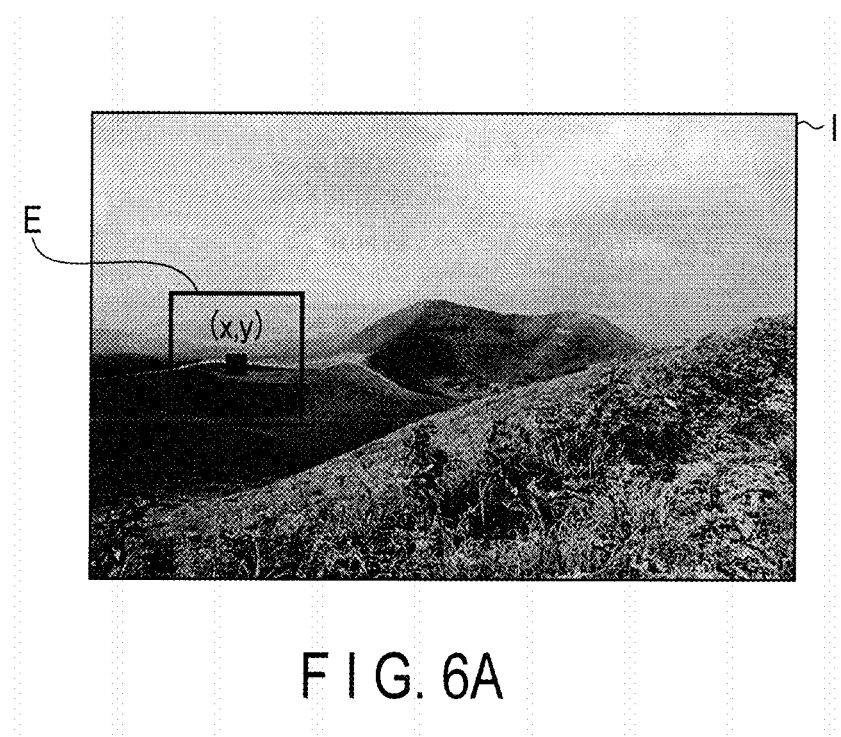
F I G. 6A

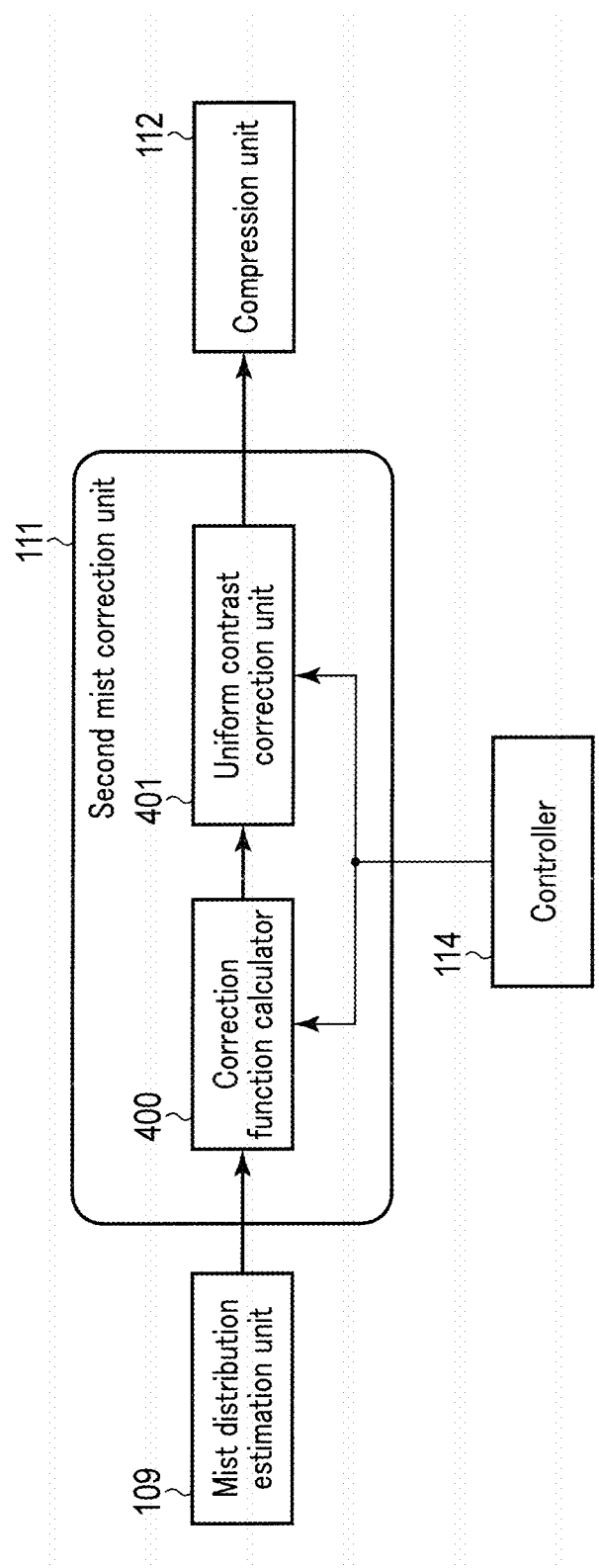
F I G. 8

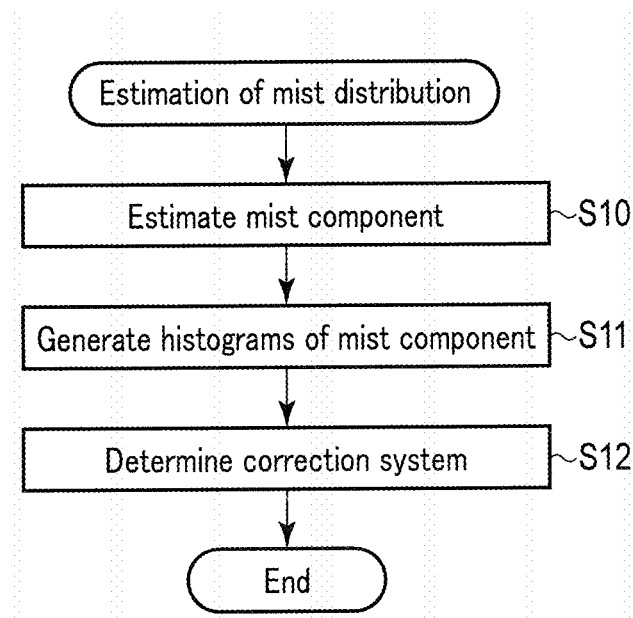
F I G. 10

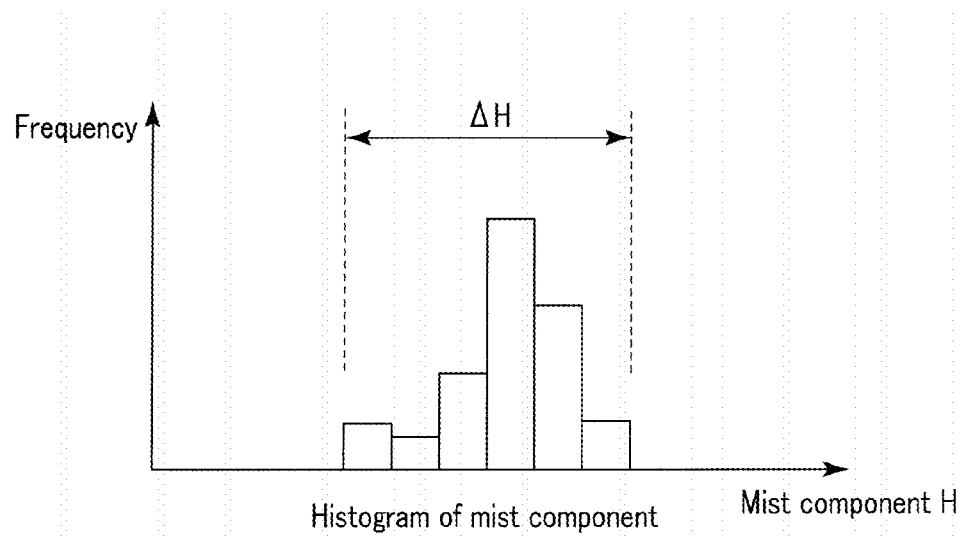
F I G. 16
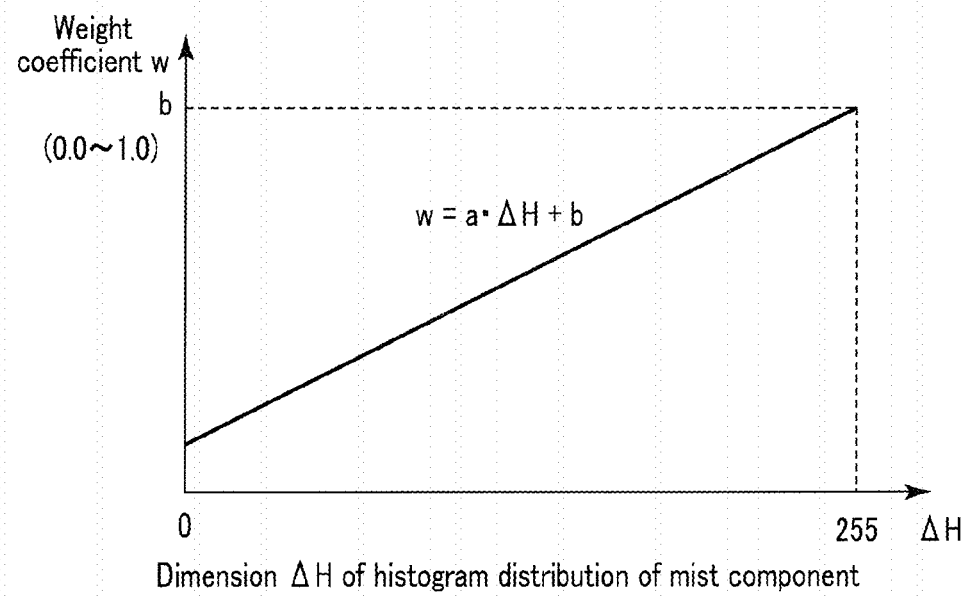
F I G. 17

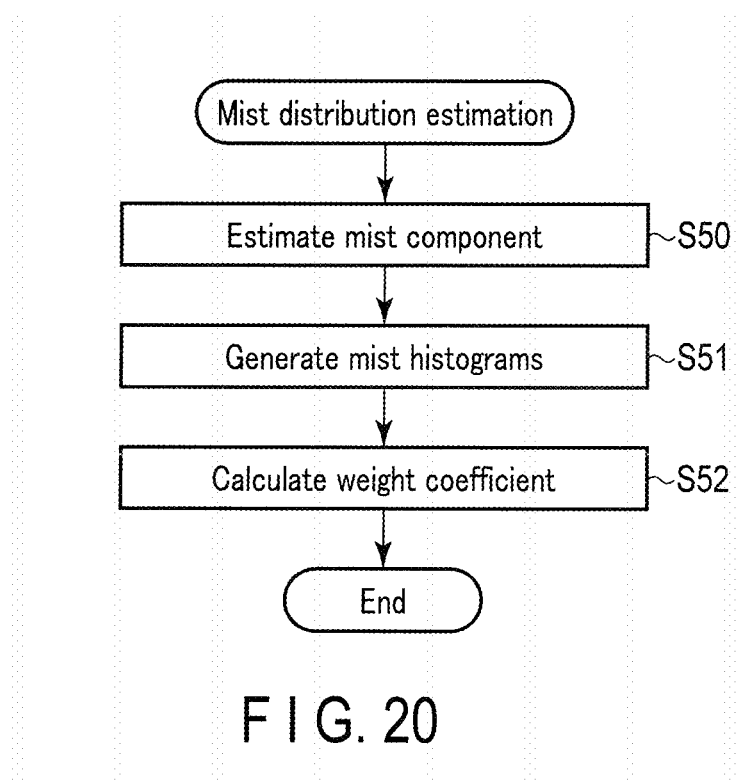
F I G. 20

IMAGE PROCESSING APPARTATUS AND METHOD, RECORDING MEDIUM STORING IMAGE PROCESSING PROGRAM READABLE BY COMPUTER, AND IMAGING APPARATUS

CROSS-REFERENCE TO RELATED APPLICATIONS

This application is a Continuation Application of PCT Application No. PCT/JP2015/054816, filed Feb. 20, 2015 and based upon and claiming the benefit of priority from the prior Japanese Patent Application No. 2014-078922, filed Apr. 7, 2014, the entire contents of both of which are incorporated herein by reference.

BACKGROUND OF THE INVENTION

1. Field of the Invention

The present invention relates to an image processing apparatus and method, an image processing program and an imaging apparatus, which correct an image whose image quality, including contrast and colors, is impaired by the haze, fog, or the like.

2. Description of the Related Art

The image quality of an image, including contrast and colors, may be impaired by the haze or fog generated in the atmosphere. For example, a landscape photograph of a distant mountain may be taken outdoors. If the distant mountain is in mist, the photographed image is degraded by the mist, and the distant mountain may not be clearly recognized in the photograph.

Jpn. Pat. Appln. KOKAI Publication No. 2012-054659 and Jpn. Pat. Appln. KOKAI Publication No. 2010-152536 (Japanese Patent No. 4982475) propose technology for solving the problem. Jpn. Pat. Appln. KOKAI Publication No. 2012-054659 calculates a maximal brightness value and a minimal brightness value from the image, and contrast correction is made to increase the difference between the calculated maximal and minimal brightness values, thereby improving the visibility of the image. If the landscape of the photograph is entirely in mist, the technique disclosed in Jpn. Pat. Appln. KOKAI Publication No. 2012-054659 can be fully effective.

Jpn. Pat. Appln. KOKAI Publication No. 2010-152536 calculates a maximal brightness value and a minimal brightness value for each of local regions of an image, and adaptive contrast correction is made to increase each of the differences between the calculated maximal values and minimal brightness values. Jpn. Pat. Appln. KOKAI Publication No. 2010-152536 enables sufficient contrast correction even if the image includes both a mist region and a non-mist region.

BRIEF SUMMARY OF THE INVENTION

According to the first aspect of the invention, there is provided an image processing apparatus comprising: a degree-of-degradation detector which detects a degree of degradation from values of color channels in each of areas including a pixel of interest in image data, the degree of degradation indicating an unclearness in each of the areas, and the image data comprising pieces of pixel data including the color channels; a degree-of-degradation estimation unit which estimates a dispersion of the degree of degradation in the image data; a correction system selector which selects either a first gradation correction system or a second gradation correction system in accordance with the dispersion of the degree of degradation; and a gradation correction unit which performs gradation correction of the image data based on either the selected first or second gradation correction system, wherein the first gradation correction system performs adaptive gradation correction based on the degree of degradation of each of the areas of the image data, the second gradation correction system performs uniform gradation correction for entirety of the image data, and the correction system selector selects the first gradation correction system when the dispersion of the degree of degradation is equal to or more than a predetermined value, and selects the second gradation correction system when the dispersion of the degree of degradation is less than the predetermined value.

According to the second aspect of the invention, there is provided an image processing method comprising: detecting a degree of degradation from values of color channels in each of areas including a pixel of interest in image data, the degree of degradation indicating an unclearness in each of the areas, and the image data comprising pieces of pixel data including the color channels; estimating a dispersion of the degree of degradation in the image data; selecting either a first gradation correction system or a second gradation correction system in accordance with the dispersion of the degree of degradation; and performing gradation correction for the image data based on either the selected first or second gradation correction system, wherein the first gradation correction system performs adaptive gradation correction based on the degree of degradation of each of the areas of the image data, the second gradation correction system performs uniform gradation correction for entirety of the image data, and the first gradation correction system is selected when the dispersion of the degree of degradation is equal to or more than a predetermined value, and the second gradation correction system is selected when the dispersion of the degree of degradation is less than the predetermined value.

According to the third aspect of the invention, there is provided a non-transitory recording medium storing an image processing program readable by a computer, the image processing program comprising: a degree-of-degradation detection function of detecting a degree of degradation from values of color channels in each of areas including a pixel of interest in image data, the degree of degradation indicating an unclearness in each of the areas, and the image data comprising pieces of pixel data including the color channels; a degree-of-degradation estimation function of estimating a dispersion of the degree of degradation in the image data; a correction system selection function of selecting either a first gradation correction system or a second gradation correction system in accordance with the dispersion of the degree of degradation; and a gradation correction function of performing gradation correction for the image data based on either the selected first or second gradation correction system, wherein the first gradation correction system performs adaptive gradation correction based on the degree of degradation of each of the areas of the image data, the second gradation correction system performs uniform gradation correction for entirety of the image data, and the correction system selection function selects the first gradation correction system when the dispersion of the degree of degradation is equal to or more than a predetermined value, and selects the second gradation correction system when the dispersion of the degree of degradation is less than the predetermined value.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating an imaging apparatus to which an image processing apparatus according to the first embodiment of the present invention is applied;

FIG. 2 is a specific block diagram illustrating the mist distribution estimation unit of the imaging apparatus;

FIG. 5 is a diagram illustrating an example of a first mist correction unit of the imaging apparatus;

FIG. 6A illustrates how each local area of an input image is scanned when the input image is input in the correction coefficient calculator of the imaging apparatus;

FIG. 8 is a diagram illustrating an example of a second mist correction unit of the imaging apparatus;

FIG. 10 is a flowchart illustrating a mist distribution estimation operation performed by the imaging apparatus;

FIG. 16 illustrates the dimension ΔH of the distribution of a histogram of the mist component H(x, y);

FIG. 17 is a graph illustrating a weight coefficient calculated by the mist distribution estimation unit;

FIG. 20 is a flowchart illustrating a mist distribution estimation operation performed by the imaging apparatus.

DETAILED DESCRIPTION OF THE INVENTION

First Embodiment

Figure 3A:
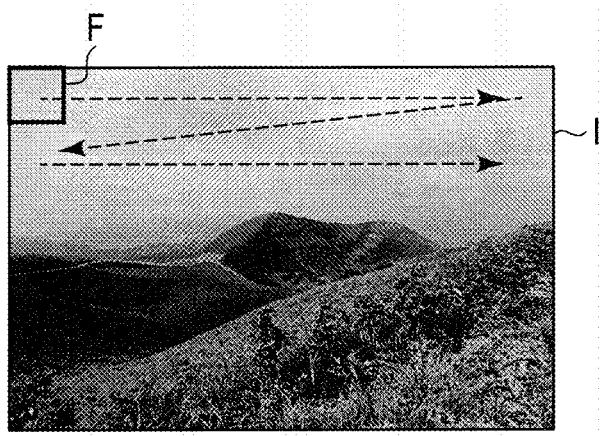
FIG. 3A is a schematic diagram illustrating how the imaging apparatus estimates a mist component H(x, y) of each of the pixels of an input image.

The first embodiment of the present invention will now be described with reference to the accompanying drawings.

FIG. 1 is a block diagram illustrating an imaging apparatus to which an image processing apparatus is applied. In FIG. 1, the thick-solid-line arrows indicate how an image signal is supplied, the thin-solid-line arrows indicate how a control signal is supplied, and the broken-line arrows indicate how other signals are supplied. The same holds true of FIGS. 2, 5, 8 and 13-15 as well.

A lens system 100 includes a focusing lens, an aperture 101, etc. and forms an optical image of an object. The lens system 100 includes an autofocus motor (AF motor) 103, and moves the focusing lens in the optical axis direction in accordance with the driving of the AF motor 103. The driving of the AF motor 103 is controlled by a lens controller 107.

An image pickup sensor 102 is on the optical axis of the lens system 100. The image pickup sensor 102 receives an optical image from the lens system 100, performs photoelectric conversion for the optical image, and outputs RGB analog image signals. A buffer 105, a signal processor 108, and a mist distribution estimation unit 109 are connected to the output terminal of the image pickup sensor 102 by way of an A/D converter 104. A first mist correction unit 110 and a second mist correction unit 111 arranged in parallel are connected to the output terminal of the mist distribution estimation unit 109. An output unit 113 is connected to the output terminals of the first mist correction unit 110 and the second mist correction unit 111 by way of a compression unit 112. A photometric evaluator 106 is connected to the buffer 105.

The A/D converter 104 converts an RGB analog image signal output from the image pickup sensor 102 into a digital image signal.

The buffer 105 temporarily stores the digital image signal supplied from the A/D converter 104.

The photometric evaluator 106 measures and evaluates light incident on the image pickup sensor 102, based on the digital image signal stored in the buffer 105 (light measurement and evaluation). The photometric evaluator 106 controls the aperture 101 of the lens system 100 based on the light measurement and evaluation and a control signal output from the controller 114. By so doing, the photometric evaluator 106 adjusts the output level of the analog image signal output from the image pickup sensor 102.

The signal processor 108 performs known image processing for the digital image signal stored in the buffer 105, including interpolation processing, WB correction processing and noise reduction processing. The digital image signal subjected to the image processing is supplied to the mist distribution estimation unit 109.

The mist distribution estimation unit 109 estimates a mist component from the digital image signal supplied from the signal processor 108 and determines, based on the distribution information on the mist component, which mist correction unit (the first mist correction unit 110 or the second mist correction unit 111) should be used. The first mist correction unit 110 and the second mist correction unit 111 are different in terms of the mist correction systems they use. The mist distribution estimation unit 109 determines which system should be used for mist correction.

The first mist correction unit 110 performs adaptive contrast correction for the digital image signal supplied from the signal processor 108 such that the contrast of a low-contrast portion caused by the mist is emphasized.

The second mist correction unit 111 performs uniform contrast correction for the digital image signal supplied from the signal processor 108 such that the entire image is subjected to uniform contrast correction.

The digital image signal corrected by the first mist correction unit 110 or the second mist correction unit 111 is supplied to the compression unit 112.

The compression unit 112 performs such known compression processing as JPEG and MPEG for the digital image signal supplied from the first mist correction unit 110 or the second mist correction unit 111, and supplies the resultant compressed signal to the output unit 113.

The output unit 113 stores the compressed digital image signal in a storage medium such as a memory card.

A more specific description will be given of the mist distribution estimation unit 109, the first mist correction unit 110 and the second mist correction unit 111.

FIG. 2 is a specific block diagram illustrating the mist distribution estimation unit 109. The mist distribution estimation unit 109 includes a mist component estimation unit 200, a mist histogram generator 201 and a correction system determination unit 202. The signal processor 108 is connected to the input terminal of the mist component estimation unit 200. The correction system determination unit 202 is connected to the output terminal of the mist component estimation unit 200 by way of the mist histogram generator 201. The first mist correction unit 110 and the second mist correction unit 111 are connected to the output terminal of the correction system determination unit 202.

The mist component estimation unit (degree-of-degradation detector) 200 receives a digital image signal supplied from the signal processor 108 and estimates a degree of degradation which would likely to degrade the image data obtained from the digital image signal. The degree of degradation is an index which impairs image quality of image data (including the contrast and colors) and which therefore degrades the visibility of an image. In the estimation of the degree of degradation, the gradations of a mist component, a haze component, a cloud component, etc., which are included in image data and are likely to degrade the image quality, are estimated.

The degree of degradation caused by a mist component is estimated based on the feature of the mist component, namely, the mist component has a high brightness and a low saturation. In other words, the higher the brightness is and the lower the saturation is, the higher will be the degree of degradation of the mist component. In the estimation of the degree of degradation, the color channels at each pixel of image data are compared with each other. Namely, the R values are compared with each other, the G values are compared with each other, and B values are compared with each other, so as to obtain a minimal R value, a minimal G value and a minimal B value.

To be more specific, the mist component estimation unit 200 receives a digital image signal from the signal processor 108, and estimates the mist component at each pixel based on the R value, G value and B value of the pixel of the coordinates (x, y) obtained from the digital image signal. The mist component represents the state of mist, the density of mist, etc.

Let us assume that in input image I obtained from the digital image signal supplied from the signal processor 108, the mist component at coordinates (x, y) is H(x, y), and the R value, G value and B value at coordinates (x, y) are Ir, Ig and Ib, respectively. In this case, the mist component H(x, y) at each pixel of the coordinates (x, y) can be estimated according to the following formula (1):

$$H(x, y) = \min(Ir, Ig, Ib) \qquad (1)$$

FIG. 3A is a schematic diagram illustrating how a mist component H(x, y) at each pixel is estimated. The mist component estimation unit 200 determines a scan area (small area) F having a predetermined size for the input image I acquired from the digital image signal supplied from the signal processor 108, and scans the scan area. The scan area F has a predetermined matrix size of, for example, n×m (n, m: natural numbers). The scan area F is an area of, for example, 5×5 pixels. The center of the scan area F is a pixel of interest. The scan area F may be constituted by one pixel.

The mist component estimation unit 200 scans the scan area F in the input image I and calculates min(Ir, Ig, Ib) each time the scan area F including a pixel of interest of the input image I is scanned. The calculated min(Ir, Ig, Ib) is regarded as a mist component H(x, y).

To be more specific, each time the scan area F is scanned, the mist component estimation unit 200 calculates (Ir, Ig, Ib) in the matrix of n×m pixels including the pixel of interest of the scan area F. Of the values of (Ir, Ig, Ib), the minimal value is regarded as the mist component H(x, y) of the pixel of interest. (H(x, y)=min(Ir,Ig,Ib))

The mist component estimation unit 200 calculates the mist component H(x, y) of a pixel of interest as the degree of degradation of the pixel of interest or as the degree of degradation of the scan area F. As will be described later, the larger the mist component H(x, y) is, the higher the degree of degradation becomes.

Figure 3B:
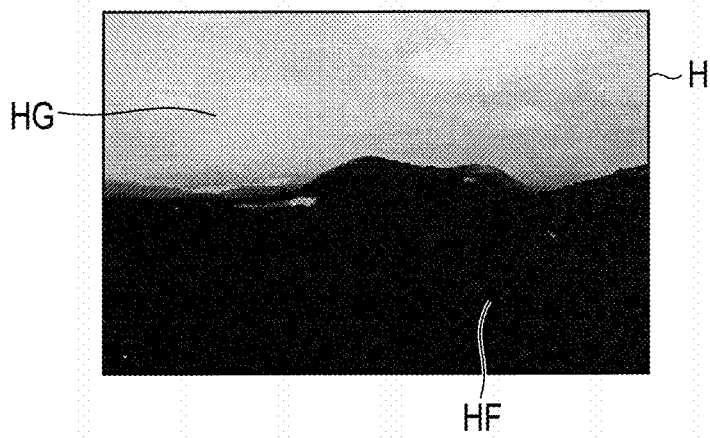
FIG. 3B illustrates how a mist component H(x, y) is processed when the imaging apparatus forms an image of min(Ir, Ig, Ib) for each of pixels of interest.

FIG. 3B illustrates a mist component H(x, y) which is processed when an image is formed based on min(Ir, Ig, Ib) for each of pixels of interest. The pixel values of an area having a high brightness and a low saturation are featured in that the R value, the G value and the B value are large and equal to each other. As a result, min(Ir, Ig, Ib) on the right side of formula (1) takes on a large value. That is, the mist component H(x, y) takes on a large value in a region having a high brightness and a low saturation. Therefore, the degree of degradation can be regarded as being high in the region having a high brightness and a low saturation.

With respect to the pixel values of a region having a low brightness or a high saturation, one of the R value, G value and B value is small, and the value of the min(Ir, Ig, Ib) is small, accordingly. In other words, in a region having a low brightness or a high saturation, the mist component H(x, y) takes on a small value. In other words, the degree of degradation can be regarded as being low in the region having a low brightness and a high saturation.

The mist component H(x, y) takes on a larger value in accordance with an increase in the mist density, and the degree of degradation becomes higher, accordingly. The mist component H(x, y) takes on a smaller value in accordance with a decrease in the mist density, and the degree of degradation becomes lower, accordingly. The mist component H(x, y) is supplied to the mist histogram generator 201. In FIG. 3B, HG indicates a dense mist region and HF indicates a light mist region.

The mist histogram generator (degree-of-degradation estimation unit) 201 counts the frequency of appearance of each value of the mist component H(x, y) supplied from the mist component estimation unit 200, and generates a histogram of the mist component H (x, y). The mist histogram generator 201 not only generates the histogram of the mist component H(x, y) but also obtains a standard deviation σ, an average value a, the difference between a maximal value and a minimal value, the ratio between the maximal value and the minimal value, etc. from the histogram.

Figure 4A:
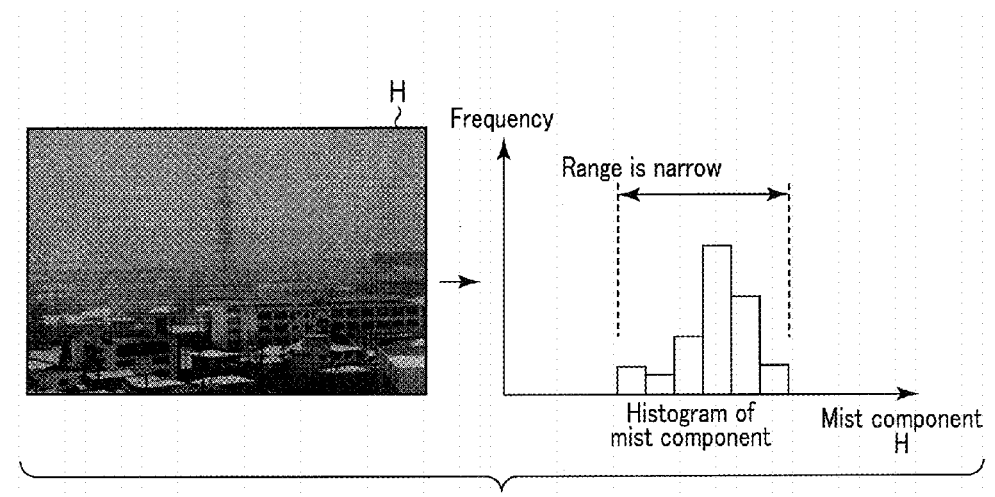
FIG. 4A shows a histogram of a mist component H(x, y) of an image which is entirely in uniform mist and has a high brightness and a low saturation.
Figure 4B:
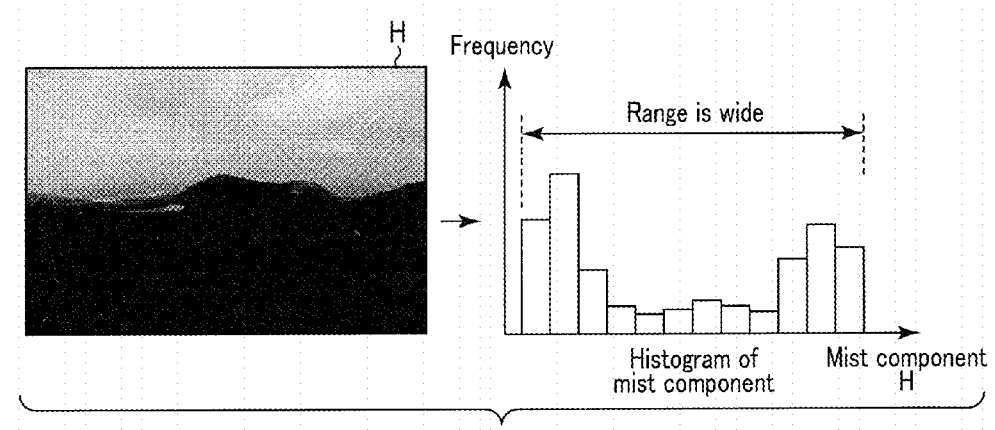
FIG. 4B shows a histogram of a mist component H(x, y) of an image having both a mist region and a non-mist region.

FIGS. 4A and 4B illustrate examples of histograms of the mist component H(x, y). As described above, the mist component H(x, y) takes on a small value in a non-mist image region having a high saturation, and takes on a large value in a mist image region having a high brightness and a low saturation.

FIG. 4A shows an image in which the entirety is uniformly in mist. In this image, the brightness is high and the saturation is low at each portion. In the histogram of the mist component H(x, y) of the image shown in FIG. 4A, a top (a maximal frequency value) is located at a position where the mist component H(x, y) has a comparatively large value, and the mist component H(x, y) is distributed within a narrow range. In other words, in the histogram, the range of the values of the mist component H(x, y) is narrow (the distribution range is narrow).

On the other hand, FIG. 4B shows an image including both a mist region and a non-mist region. In the histogram of the mist component H(x, y) of the image shown in FIG. 4B, the mist component H(x, y) takes on values between small and large and is distributed in a wide range. In other words, in the histogram, the range of the values of the mist component H(x, y) is wide (the distribution range is wide).

From these distributions of the histogram of the mist component H(x, y), therefore, how the mist is distributed in the images can be estimated.

The histograms of mist component H(x, y) generated by the mist histogram generator 201 are supplied to the correction system determination unit 202. Together with the histograms of the mist component H(x, y), indexes obtained therefrom are supplied to the correction system determination unit 202, including the standard deviation σ, average value a, the difference between a maximal value and a minimal value, and the ratio between the maximal value and the minimal value.

Based on the histogram information on the mist component H(x, y) supplied from the mist histogram generator 201, the correction system determination unit (correction system selector) 202 determines which contrast correction system should be selected from between the first correction system (first gradation correction system) which performs adaptive contrast correction and the second correction system (second gradation correction system) which performs uniform contrast correction. The first correction system corresponds to the correction performed by the first mist correction unit 110, while the second correction system corresponds to the correction performed by the second mist correction unit 111.

A description will be given of the mist correction. In an image, the region covered in mist has a low contrast. In order to suppress the adverse effects of the mist and improve the visibility, the contrast should be emphasized. If an image includes a mist region only in part, uniform contrast correction should not be performed in the contrast emphasis processing. Even if such contrast correction is performed, the adverse effects of the mist cannot be fully suppressed or the visibility of the image cannot be satisfactorily improved.

For this reason, adaptive contrast correction may be performed for each of the local areas of the image. It should be noted, however, that the adaptive contrast correction does not work satisfactorily at all times. Depending upon the image property, the adaptive contrast correction may result in unnaturalness of a corrected image. For example, the adaptive contrast correction does not work satisfactorily for such an image as is shown in FIG. 4A, i.e., an image in which the entirety is uniformly in mist and the histogram of the image are limited to a narrow range.

Basically, the adaptive contrast correction is performed by determining correction coefficients based on the histograms of the brightness and color signals of each local area of an image. In this correction, the correction coefficient applied to pixels varies depending upon how the histograms of the brightness and color signals are distributed.

However, there may be a case where the histogram distribution changes between pixels which are located in the neighborhood of the boundary between local areas. In such a case, the pixel values of the adjacent pixels may differ greatly from each other after the adaptive contrast correction. As a result, the brightness values of the adjacent pixels may differ greatly from each other after the adaptive contrast correction, resulting in unevenness of brightness.

As described above, where the histogram range of the entire image is narrow, uniform contrast correction should be desirably made to the entire image because the making of such correction reduces the difference between the pixel values of the adjacent pixels.

Therefore, the present apparatus switches between the two contrast correction systems in accordance with how the mist component H (x, y) is distributed in the entire image. To be more specific, where the distribution of the mist component H (x, y) in the entire image is wide, it is assumed that the image includes a portion covered in mist, and the adaptive contrast correction is performed. Where the distribution of the mist component H (x, y) in the entire image is narrow, it is assumed that the entire image is in mist, and the uniform contrast correction is performed.

The correction system determination unit 202 estimates the distribution of the mist component H (x, y) based on the range of the histogram of the mist component H (x, y), and the correction system to be executed is determined based on a result of estimation. The range of the histogram of the mist component H (x, y) is calculated from the indexes of the histogram, including a standard deviation σ, an average value a, the difference between a maximal value and a minimal value, the ratio between the maximal value and the minimal value.

When a correction system to be used is determined, a standard deviation σ of the histogram of the mist component H (x, y) and a threshold (predetermined value) th are obtained to select either the first or second contrast correction system. Alternatively, a difference or a ratio between a maximal value and a minimal value is obtained and is compared with a predetermined threshold th, to select either the first or second contrast correction system.

For example, where the standard deviation σ of the histogram of the mist component H(x, y) and the threshold th are used, the correction system determination unit 202 compares the standard deviation σ with the threshold th. If the following is satisfied, $$\sigma \geq th \qquad (2)$$

then the first correction system (first mist correction unit 110) is selected. That is, the adaptive contrast correction is performed for such an image as is shown in FIG. 4B, i.e., an image which includes both a mist region and a non-mist region and the values of the mist component H(x, y) are distributed in a wide range. In the adaptive contrast correction, only the mist region of the image is subjected to the contrast correction.

If the comparison between the standard deviation σ and the threshold th shows that the following is satisfied, $$\sigma < th \tag{3}$$

then the second correction system (second mist correction unit 111) is selected by the correction system determination unit 202. That is, the uniform contrast correction is performed for such an image as is shown in FIG. 4A, i.e., an image in which the entirety is uniformly in mist and the values of the mist component H(x, y) are distributed in a narrow range.

When determining the first correction system, the correction system determination unit 202 supplies the digital image signal received from the signal processor 108 to the first mist correction unit 110. When determining the second correction system, the correction system determination unit 202 supplies the digital image signal received from the signal processor 108 to the second mist correction unit 111.

Although the correction system is to be used was described as being determined based on the histogram of the mist component H (x, y), the distribution of the mist component H (x, y) may be determined based on the histogram of a brightness. In practice, however, this method is not suitable for the reason below. For example, let us consider a case where an image includes a non-mist region having a high saturation, such as (Ir, Ig, Ib)=(225,200,0). In this case, the brightness (a·Ir+b·Ig+c·Ib) of the non-mist region takes on a large value (a, b and c are coefficients).

Therefore, even where the image includes such a non-mist region, the use of a brightness histogram may undesirably lead to the determination that the entire image is in uniform mist.

The use of the brightness histogram is therefore unsuitable when the distribution of the mist component H (x, y) is estimated. The apparatus therefore estimates the distribution of the mist component H (x, y) based on the histogram of the mist component H (x, y), thereby improving the estimation accuracy of the distribution.

FIG. 5 illustrates an example of a configuration of the first mist correction unit (gradation correction unit) 110. The first mist correction unit 110 performs adaptive contrast correction using the first correction system. To be more specific, the first mist correction unit 110 receives a digital image signal supplied from the signal processor 108 and performs contrast emphasis correction for the digital image signal such that the contrast of a low-contrast portion caused by the mist or the like is emphasized. The corrected image signal is supplied to the compression unit 112.

The first mist correction unit 110 includes a correction coefficient calculator 300 and an adaptive contrast correction unit 301. The correction coefficient calculator 300 is connected to the adaptive contrast correction unit 301. The compression unit 112 is connected to the output terminal of the adaptive contrast correction unit 301. The controller 114 controls both the correction coefficient calculator 300 and the adaptive contrast correction unit 301.

Based on the digital image signal and mist component H (x, y) supplied from the mist distribution estimation unit 109, the correction coefficient calculator 300 calculates a correction coefficient for contrast correction, which is to be applied to each of the pixels of the input image I acquired from the digital image signal. This correction coefficient is calculated by scanning a pixel of interest of input image I and generating histograms of the R, G and B in a region which is of predetermined size and the center of which is the scanned pixel of interest. The correction coefficient calculator 300 multiplies the correction coefficient calculated based on the R, G and B histograms by a weight coefficient corresponding to the value of the mist component H(x, y). The correction coefficient multiplied by the weight coefficient is supplied to the adaptive contrast correction unit 301.

The adaptive contrast correction unit 301 multiplies an image signal by the correction coefficient supplied from the correction coefficient calculator 300 and corresponding to each pixel, thereby performing contrast correction.

A specific description will be given of the correction coefficient calculator 300 and the adaptive contrast correction unit 301.

The correction coefficient calculator 300 calculates a correction coefficient (a gain coefficient) for gradation correction, with respect to each of the scan areas (small areas) F (FIG. 3A) of the image data. The correction coefficient calculator 300 calculates a correction coefficient for contrast emphasis with respect to a low-contrast region of the input image I acquired from the digital image signal supplied from the mist distribution estimation unit 109. The correction coefficient calculator 300 calculates the correction coefficient without reference to the mist component H(x, y).

Figure 6B:
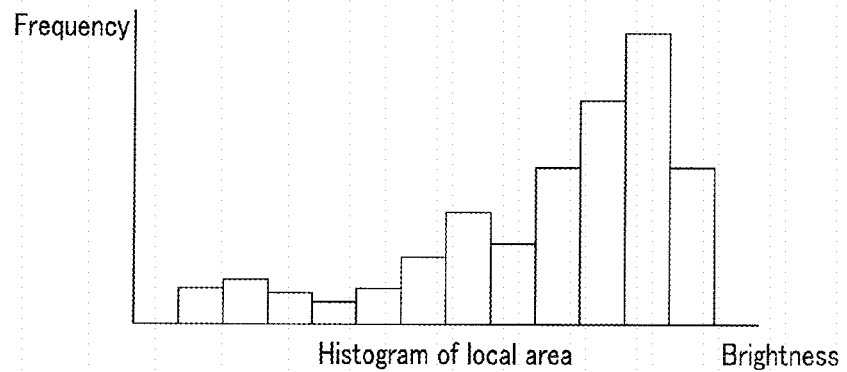
FIG. 6B shows a local area histogram generated by the correction coefficient calculator of the imaging apparatus.

To be more specific, the correction coefficient calculator 300 scans the inside region of the local area E of the input image I, as shown in FIG. 6A. The correction coefficient calculator 300 generates histograms (local area histograms) of the R value, G value and B value of the local area E, the center of which is a pixel of interest, as shown in FIG. 6B. In the histogram shown in FIG. 6B, the abscissa axis represents a brightness component of the R value, G value or B value, while the ordinate axis represents a frequency (the number of pixels). The local area E is formed as a matrix having a predetermined size k×l (k, l: natural numbers). The center of the matrix corresponds to a pixel of interest.

Figure 6C:
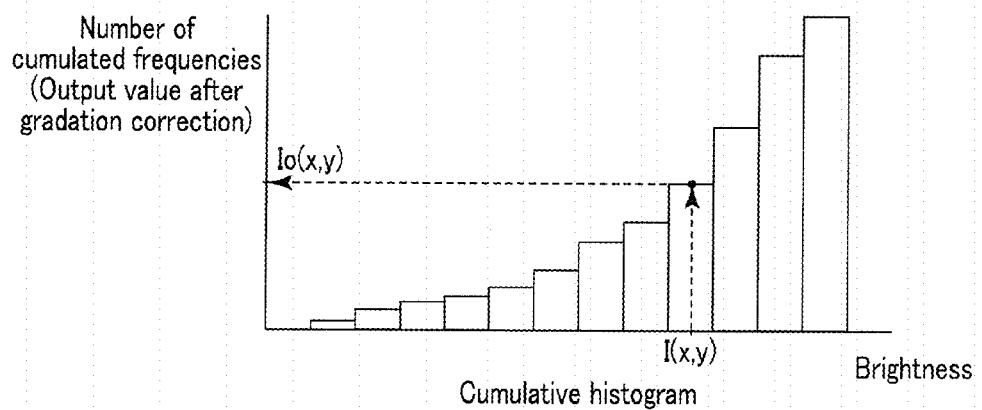
FIG. 6C shows a cumulative histogram generated by the correction coefficient calculator of the imaging apparatus.

The correction coefficient calculator 300 cumulates the local area histograms generated for the pixels of interest of the input image I, and generates a cumulative histogram, such as that shown in FIG. 6C. In the cumulative histogram shown in FIG. 6C, the abscissa axis represents a brightness component of the R value, G value or B value. The ordinate axis represents the number of cumulated color pixels (cumulative pixel number) corresponding to the brightness components of the R value, G value or B value, or an output value after gradation correction (histogram equalization) of color pixels corresponding to the R value, G value or B value. When gradation correction (histogram equalization) is performed based on a cumulative histogram, known image processing technology may be used.

Based on the cumulative histogram (such as that shown in FIG. 6C), the correction coefficient calculator 300 calculates correction coefficients (gain coefficients) corresponding to the R value, G value and B value of a pixel of interest, namely, gain R, gain G and gain B.

Let us assume that brightness components of the R value, G value and B value of a pixel of interest (x, y) are I_r(x, y), I_g(x, y) and I_b(x, y), respectively. Let us also assume that brightness components of the R value, G value and B value calculated based on the cumulative histogram shown in FIG. 6C and corresponding to the corrected output image (corrected image) are Io_r(x, y), Io_g(x, y) and Io_b(x, y), respectively.

In this case, correction coefficients gain R, gain G and gain B are given as follows:

$$\text{gain } R = Io\_r(x, y)/I\_r(x, y) \quad (4)$$

$$\text{gain } G = Io\_g(x, y)/I\_g(x, y) \quad (5)$$

$$\text{gain } B = Io\_b(x, y)/I\_b(x, y) \quad (6)$$

The correction coefficient calculator 300 calculates correction coefficients gain R, gain G and gain B for histogram equalization of the local area, for each of the pixels of the input image I. The correction coefficients gain R, gain G and gain B are gain coefficients, which are multipliers applied to the color channels R, G and B of the pixels of the input image I. The correction coefficients gain R, gain G and gain B are calculated in accordance with the pixel information (such as a histogram, a maximal value and a minimal value) of a designated local area E having a pixel of interest at the center.

The correction coefficient calculator 300 supplies the calculated correction coefficients (gain coefficients) gain R, gain G and gain B to the adaptive contrast correction unit 301.

The correction coefficients are calculated based on the histograms of the R, G and B values, but this is not restrictive. For example, the correction coefficients may be calculated based on histograms of brightness signals. The output values subjected to the gradation coefficients are calculated using a cumulative histogram, but this is not restrictive. For example, the output values maybe calculated based on a linear function, a non-linear function, a broken line approximation function, etc. generated from the information on the histograms mentioned above.

The adaptive contrast correction unit (adaptive gradation correction unit) 301 performs adaptive gradation correction (contrast correction) in accordance with the mist component H(x, y) of image data, based on the mist component H(x, y) estimated by the mist component estimation unit 200 of the mist distribution estimation unit 109 and the correction coefficients gain R, gain G and gain B calculated by the correction coefficient calculator 300. To be more specific, the adaptive contrast correction unit 301 receives the mist component H(x, y) estimated by the mist component estimation unit 200 and the correction coefficients gain R, gain G and gain B calculated by the correction coefficient calculator 300 and performs contrast correction (namely, multiplication of the gains for each of the pixels of the input image I) based on the mist component H(x, y) and the correction coefficients gain R, gain G and gain B.

Figure 7:
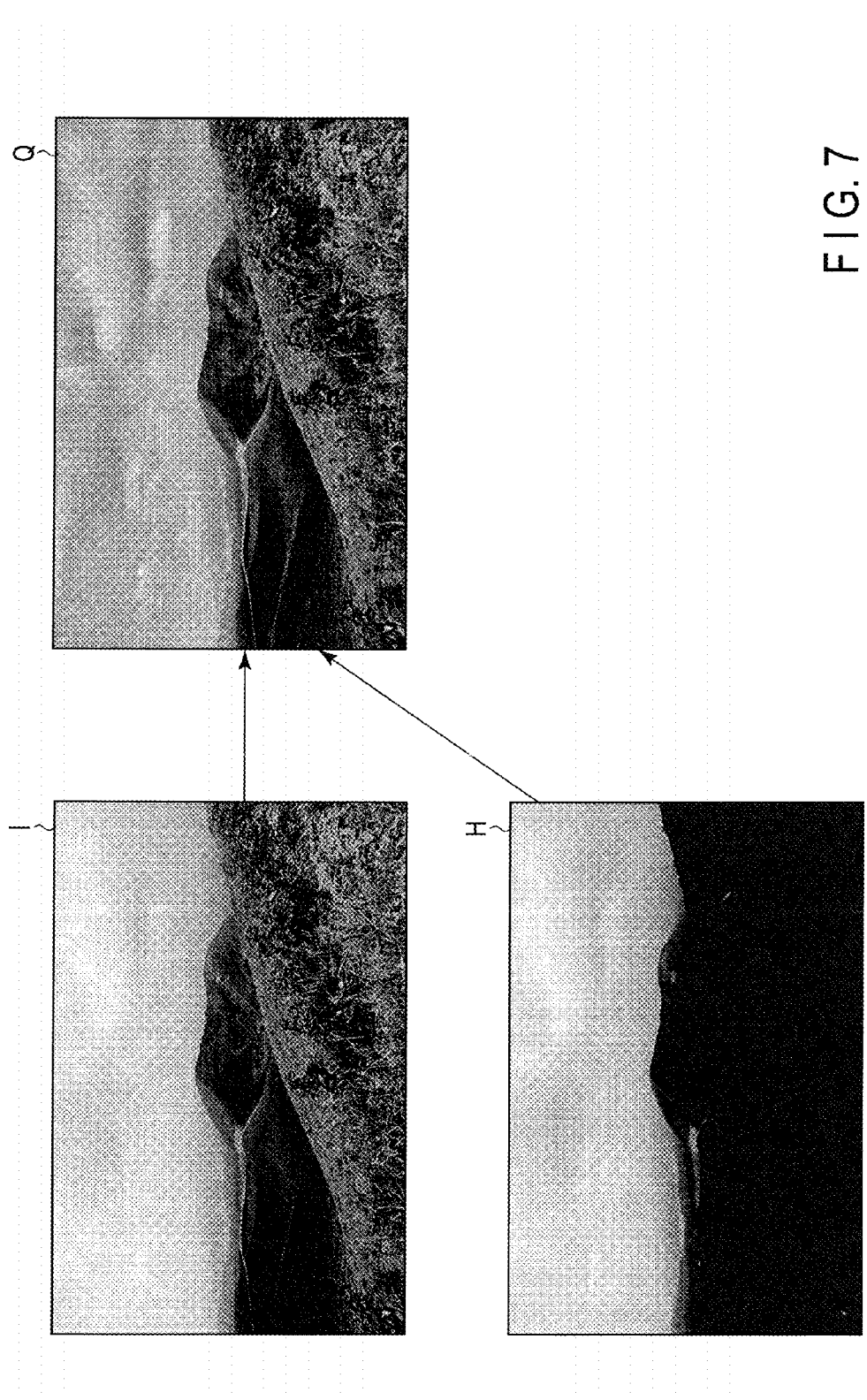
FIG. 7 shows schematic diagrams illustrating a contrast correction operation performed by the contrast correction unit of the imaging apparatus.

As shown in FIG. 7, the adaptive contrast correction unit 301 adjusts the correction coefficients gain R, gain G and gain B in accordance with the mist component H(x, y) of each of the pixels of the input image I. The adaptive contrast correction unit 301 multiplies the pixel values of the pixels by the adjusted correction coefficients gain R, gain G and gain B, thereby producing a corrected image Q whose contrast is corrected.

The adaptive contrast correction unit 301 maintains the original values of the correction coefficients gain R, gain G and gain B for a dense mist region of the input image I, i.e., a region having a high brightness and a low saturation, and adjusts the correction coefficients gain R, gain G and gain B to be close to 1.0 for a light mist region of the input image I, i.e., a region having a low brightness or a high saturation.

To be specific, the adaptive contrast correction unit 301 weights the correction coefficients gain R, gain G and gain B calculated by the correction coefficient calculator 300, based on the mist component H(x, y) estimated by the mist component estimation unit 200. The adaptive contrast correction unit 301 performs contrast correction for each of the pixels, using correction coefficients gain R', gain G' and gain B' which are adjusted by weighting. The adaptive contrast correction unit 301 includes a normalization coefficient calculator 301a and a coefficient converter 301b.

The normalization coefficient calculator 301a calculates a normalized coefficient by normalizing the mist component H(x, y) estimated by the mist component estimation unit 200, in accordance with the maximal value of the pixel value and the maximal value of the mist component H(x, y) of an image.

The coefficient converter 301b converts the correction coefficients gain R, gain G and gain B calculated by the correction coefficient calculator 300 into weighted correction coefficients gains R', gain G' and gain B', based on normalization coefficients calculated by the normalization coefficient calculator 301a.

The coefficient converter 301b performs conversion of the correction coefficients gain R, gain G and gain B calculated by the correction coefficient calculator 300 in such a manner that the larger the normalization coefficients calculated by the normalization coefficient calculator 301a are, the closer to the original values the converted correction coefficients become, and in such a manner that the smaller the normalization coefficients calculated by the normalization coefficient calculator 301a are, the closer to 1.0 the converted correction coefficients become.

Assuming that the correction strength parameter is denoted as Strength, the correction coefficients gain R', gain G' and gain B' adjusted by weighting are given as follows:

$$\text{gain } R' = 1.0 + (\text{gain}R - 1.0)*H(x, y)/255*\text{Strength} \quad (7)$$

$$\text{gain } G' = 1.0 + (\text{gain}G - 1.0)*H(x, y)/255*\text{Strength} \quad (8)$$

$$\text{gain } B' = 1.0 + (\text{gain}B - 1.0)*H(x, y)/255*\text{Strength} \quad (9)$$

By these correction coefficients gain R', gain G' and gain B', the mist component H(x, y) takes on a large value in a region having a high brightness and a low saturation. Therefore, the correction coefficients gain R', gain G' and gain B' are adjusted to maintain the original values of the gain R, gain G and gain B.

In a region which has a low brightness or a high saturation and which includes no mist component H (x, y), the mist component H (x, y) takes on a small value. Therefore, the correction coefficients gain R', gain G' and gain B' are adjusted to be values close to 1.0.

As can be seen from this, the adjustment using the correction coefficients gain R', gain G' and gain B' is made in such a manner that the correction strength is high in a dense mist region and is low in a light mist region.

The contrast correction is performed for each of the pixels, using correction coefficients gain R', gain G' and gain B' which are adjusted by weighting. The contrast correction is performed for each of the pixels as follows:

$$I'\_r(x, y) = I\_r(x, y)*\text{gain } R' \quad (10)$$

$$I'\_g(x, y) = I\_g(x, y)*\text{gain } G' \quad (11)$$

$$I'\_b(x, y) = I\_b(x, y)*\text{gain } B' \quad (12)$$

FIG. 8 illustrates an example of a configuration of the second mist correction unit (gradation correction unit) 111. The second mist correction unit 111 performs uniform gradation correction for the entire image and comprises a correction function calculator 400 and a uniform contrast correction unit 401.

The correction function calculator 400 is connected to the uniform contrast correction unit 401. The uniform contrast correction unit 401 is connected to the compression unit 112. The controller 114 controls both the correction function calculator 400 and the uniform contrast correction unit 401.

Based on the digital image signal supplied from the mist distribution estimation unit 109, the correction function calculator 400 calculates a correction function for contrast correction. For example, the correction function is calculated based on brightness histograms of the entire image and includes a linear function, a nonlinear function or a broken line approximation function. The correction function calculator 400 supplies information on the calculated correction function to the uniform contrast correction unit 401.

Based on the correction function supplied from the correction function calculator 400, the uniform contrast correction unit 401 performs contrast correction for the digital image signal. To be more specific, the uniform contrast correction unit 401 obtains a correction function for contrast correction from the brightness and color signals of the input image I of the digital image signal supplied from the mist distribution estimation unit 109, and performs uniform contrast correction for the entirety of the input image I, using the correction function.

The compression unit 112 performs such known compression processing as JPEG and MPEG for a digital image signal supplied from the first mist correction unit 110 or second mist correction unit 111, and supplies the resultant compressed signal to the output unit 113.

The output unit 113 stores the compressed digital image signal supplied thereto from the compression unit 112, in a memory card or the like. The output unit 113 may cause the compressed digital image signal supplied from the compression unit 112 to be shown on a display provided independently.

The controller 114 is a microcomputer or the like. The controller 114 exchanges data with the A/D converter 104, the photometric evaluator 106, the lens controller 107, the signal processor 108, the mist distribution estimation unit 109, the first mist correction unit 110, the second mist correction unit 111, the compression unit 112 and the output unit 113, and controls these elements. An external I/F section 115 is connected to the controller 114. The external I/F section 115 includes a power supply switch, a shutter button, and an interface for switching modes at the time of photography.

Next, the operation of the imaging apparatus 1 having the above-mentioned configuration will be described with reference to the photographing operation flowchart shown in FIG. 9.

When the external I/F section 115 is operated, the external I/F section 115 sends various setting information regarding the input photographing operation (e.g., various signals and header information) to the controller 114 in step S1. When the recording button of the external I/F 115 is depressed, the controller 114 switches to the photographing mode.

When an optical image from the lens system 100 is incident on the image pickup sensor 102 in the photographing mode, the image pickup sensor 102 receives the optical image from the lens system 100 and outputs an analog image signal. The analog image signal is converted into a digital image signal by the A/D converter 104, and the digital image signal is supplied to the buffer 105. The buffer 105 temporarily stores the digital image signal supplied from the A/D converter 104.

In step S2, the signal processor 108 performs image processing for the digital image signal stored in the buffer 105, including known interpolation processing, WB correction processing and noise reduction processing or the like. The digital image signal subjected to the image processing is supplied to the mist correction unit 109.

In step S3, the mist distribution estimation unit 109 estimates a mist component from the digital image signal supplied from the signal processor 108 according to the mist distribution estimation operation flowchart shown in FIG. 10 and determines, based on the distribution information on the mist component, which mist correction unit (the first mist correction unit 110 or the second mist correction unit 111) should be used.

To be more specific, in step S10, the mist component estimation unit 200 receives a digital image signal from the signal processor 108, and estimates the mist component $H(x, y)$ at each pixel based on the R value, G value and B value of the pixel of the coordinates $(x, y)$ obtained from the digital image signal.

To be specific, the mist component estimation unit 200 determines a scan area (small area) F having a predetermined size for the input image I acquired from the digital image signal supplied from the signal processor 108. The mist component estimation unit 200 scans the scan area F on the input image I and calculates $\min(Ir, Ig, Ib)$ each time the scan area F including a pixel of interest of the input image I is scanned. The calculated $\min(Ir, Ig, Ib)$ is regarded as a mist component $H(x, y)$ (Formula (1)).

The mist component $H(x, y)$ takes on a large value in a region having a high brightness and a low saturation. That is, the degree of degradation can be regarded as being high in that region.

The mist component $H(x, y)$ takes on a small value in a region having a low brightness or a high saturation. That is, the degree of degradation can be regarded as being low in that region.

The mist component estimation unit 200 supplies the mist component $H(x, y)$ to the mist histogram generator 201.

In step S11, the mist histogram generator 201 counts the frequency of appearance of each value of the mist component $H(x, y)$ supplied from the mist component estimation unit 200, and generates histograms of the mist component $H(x, y)$, such as those shown in FIGS. 4A and 4B. The mist histogram generator 201 not only generates the histograms of the mist component $H(x, y)$ but also obtains a standard deviation $\sigma$, an average value a, etc. from the histograms.

The image shown in FIG. 4A is entirely in uniform mist, and the brightness is high and the saturation is low at each portion. In the histogram of the mist component $H(x, y)$ of the image, a top is located at a position where the mist component $H(x, y)$ has a comparatively large value, and the mist component $H(x, y)$ is distributed within a narrow range.

The image shown in FIG. 4B includes both a mist region and a non-mist region. In the histogram of the mist component $H(x, y)$ of the image, the mist component $H(x, y)$ takes on values from small values to large value, and is distributed in a wide range.

The mist histogram generator 201 supplies the histograms of the mist component $H(x, y)$ to the correction system determination unit 202, and also supplies indexes obtained from the histograms to the correction system determination unit 202, including a standard deviation $\sigma$, an average value a, the difference between a maximal value and a minimal value, and the ratio between the maximal value and the minimal value.

Based on the histogram information on the mist component H(x, y) supplied from the mist histogram generator 201, the correction system determination unit 202 determines which contrast correction system should be selected from between the first correction system which performs adaptive contrast correction and the second correction system which performs uniform contrast correction (step S12).

In an image, regions covered in mist have a low contrast. In order to suppress the adverse effects of the mist and improve the visibility, the contrast should be emphasized in such mist regions. Therefore, adaptive contrast correction is performed for each of mist regions.

Figure 9:
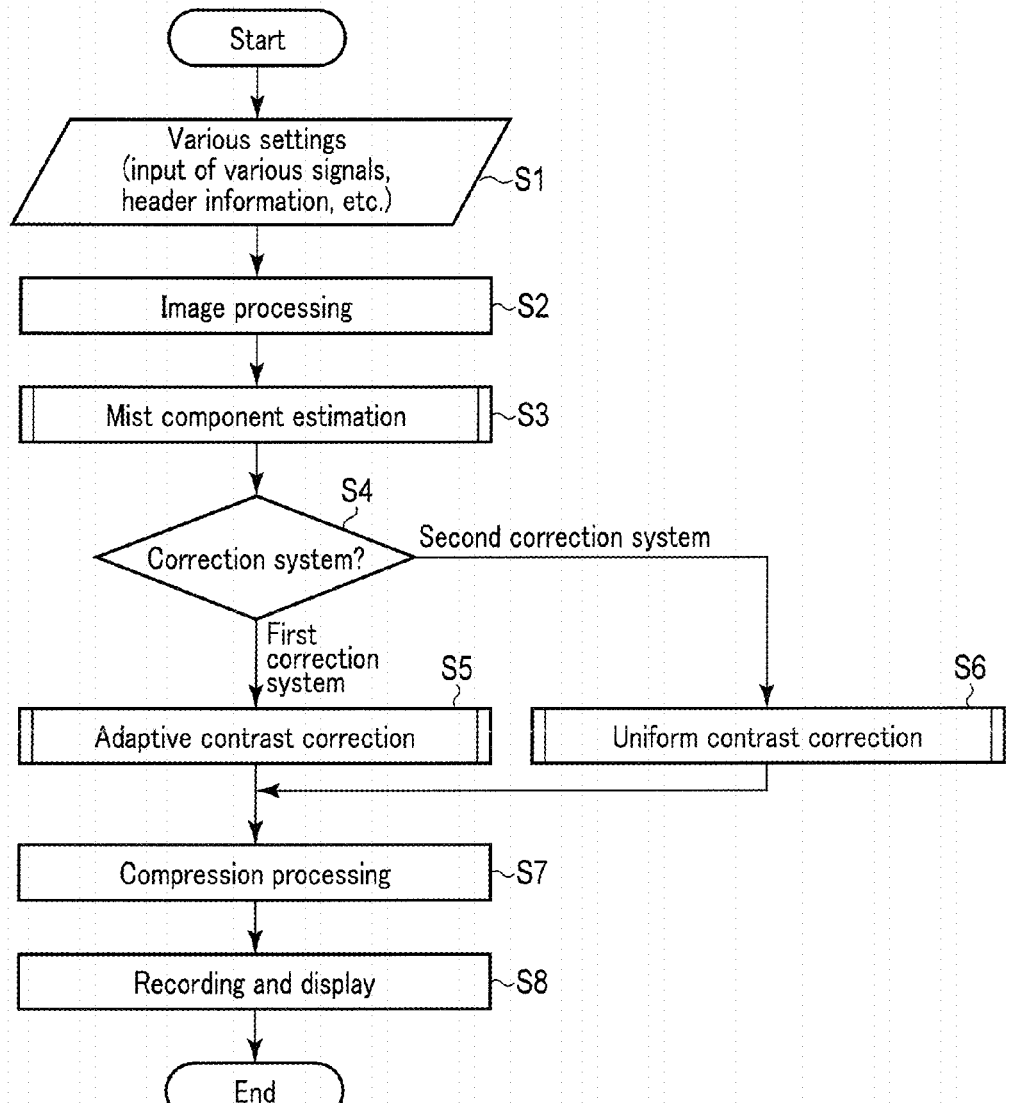
FIG. 9 is a flowchart illustrating a photographing operation performed by the imaging apparatus.

On the other hand, where the histogram range of the entire image is narrow, uniform contrast correction should be desirably made to the entire image because the making of such correction reduces the difference between the pixel values of the adjacent pixels.

Where the distribution of the mist component H (x, y) in the entire image is wide, therefore, the correction system determination unit 202 determines that the image includes a mist region and that the adaptive contrast correction should be applied (step S4 shown in FIG. 9). As indicated by formula (2), the correction system determination unit 202 compares the standard deviation σ with the threshold th, as shown in formula (2).

If the result of comparison shows σ>=th, then the correction system determination unit 202 determines that an image includes both a mist region and a non-mist region and the values of the mist component H(x, y) are distributed in a wide range. Based on this determination, the correction system determination unit 202 selects the first correction system (first mist correction unit 110), which performs adaptive contrast correction for the image.

Where the distribution of the mist component H(x, y) in the entire image is narrow, the correction system determination unit 202 determines that the entire image is uniformly in mist, and uniform contrast correction should be applied (step S4). As indicated by formula (3), the correction system determination unit 202 compares the standard deviation σ with the threshold th. If the comparison shows that σ<th, the correction system determination unit 202 determines that the entirety of the image is uniformly in mist and the values of the mist component H(x, y) are distributed in a narrow range, as shown in FIG. 4A. Based on this determination, the correction system determination unit 202 selects the second correction system (second mist correction unit 111), which performs uniform contrast correction for the image.

Figure 11:
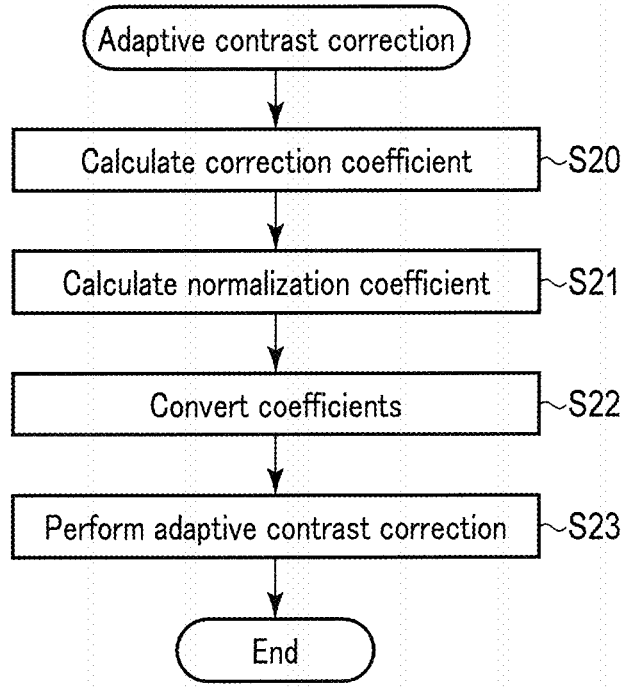
FIG. 11 is a flowchart illustrating an adaptive contrast correction operation performed by the imaging apparatus.

When determining the first correction system, the correction system determination unit 202 supplies the digital image signal received from the signal processor 108 to the first mist correction unit 110. When determining the second correction system, the correction system determination unit 202 supplies the digital image signal received from the signal processor 108 to the second mist correction unit 111.

Where the first correction system (first mist correction unit 110) is selected as a result of the correction system determination, the first mist correction unit 110 receives a digital image signal supplied from the signal processor 108, according to the adaptive contrast correction operation flowchart shown in FIG. 11. The first mist correction unit 110 performs contrast emphasis correction for the digital image signal such that the contrast of a low-contrast portion caused by the mist or the like is emphasized. The corrected digital image signal is supplied to the compression unit 112.

Based on the digital image signal and mist component H(x, y) supplied from the mist distribution estimation unit 109, the correction coefficient calculator 300 of the first mist correction unit 110 calculates a correction coefficient for contrast correction, which is to be applied to each of the pixels of the input image I acquired from the digital image signal (step S20).

To be more specific, the correction coefficient calculator 300 scans the inside region of the local area E of the input image I acquired from the digital image signal supplied from the mist distribution estimation unit 109, as shown in FIG. 6A. The correction coefficient calculator 300 generates histograms of the R value, G value and B value of the local area E, the center of which is a pixel of interest, as shown in FIG. 6B. The correction coefficient calculator 300 cumulates the histograms of the local areas E, and generates a cumulative histogram, such as that shown in FIG. 6C. Based on the cumulative histogram, the correction coefficient calculator 300 calculates correction coefficients corresponding to the R value, G value and B value of a pixel of interest, namely, the correction coefficients gain R, gain G and gain B for histogram equalization of the local area, for each of the pixels of the input image I, according to formulas (4) to (6). The correction coefficient calculator 300 supplies the calculated correction coefficients (gain coefficients) gain R, gain G and gain B to the adaptive contrast correction unit 301.

In step S23, the adaptive contrast correction unit 301 multiplies a digital image signal by the correction coefficients supplied from the correction coefficient calculator 300 and corresponding to respective pixels, thereby performing contrast correction.

To be more specific, the adaptive contrast correction unit 301 adjusts the correction coefficients gain R, gain G and gain B in accordance with the mist component H(x, y) of each of the pixels of the input image I, as shown in FIG. 7, and multiplies the pixel values of the pixels by the adjusted correction coefficients gain R, gain G and gain B, thereby producing a corrected image Q whose contrast is corrected.

The adaptive contrast correction unit 301 maintains the original values of the correction coefficients gain R, gain G and gain B for a dense mist region of the input image I, i.e., a region having a high brightness and a low saturation, and adjusts the correction coefficients gain R, gain G and gain B to be close to 1.0 for a light mist region of the input image I, i.e., a region having a low brightness or a high saturation. To be specific, the contrast correction unit 301 normalizes (or weights) the correction coefficients gain R, gain G and gain B calculated by the correction coefficient calculator 300, based on the mist component H(x, y) estimated by the mist component estimation unit 109. The adaptive contrast correction unit 301 performs contrast correction for each of the pixels, using correction coefficients gain R', gain G' and gain B' which are adjusted by weighting.

To be more specific, in step S21, the normalization coefficient calculator 301a of the adaptive contrast correction unit 301a calculates a normalized coefficient by normalizing the mist component H(x, y) estimated by the mist component estimation unit 200.

In step S22, the coefficient converter 301b converts the correction coefficients gain R, gain G and gain B calculated by the correction coefficient calculator 300 into weighted correction coefficients gain R', gain G' and gain B', based on the normalization coefficients calculated by the normalization coefficient calculator 301a.

The coefficient converter 301b performs conversion of the correction coefficients gain R, gain G and gain B calculated by the correction coefficient calculator 300 in such a manner that the larger the normalization coefficients calculated by the normalization coefficient calculator 301a are, the closer to the original values the converted correction coefficients become, and in such a manner that the smaller the normalization coefficients calculated by the normalization coefficient calculator 301a are, the closer to 1.0 the converted correction coefficients become.

Assuming that the correction strength parameter is denoted as Strength, the correction coefficients gain R', gain G' and gain B' adjusted by weighting are given by formulas (7) to (9). By these correction coefficients gain R', gain G' and gain B', the mist component H(x, y) takes on a large value in a region having a high brightness and a low saturation. Therefore, the correction coefficients gain R', gain G' and gain B' are adjusted to maintain the original values of the gain R, gain G and gain B.

In a region having a low brightness or a high saturation, the mist component H(x, y) takes on a small value. Therefore, the correction coefficients gain R', gain G' and gain B' are adjusted to be values close to 1.0. As can be seen from this, the adjustment using the correction coefficients gain R', gain G' and gain B' is made in such a manner that the correction strength is high in a dense mist region and is low in a light mist region.

Figure 12:
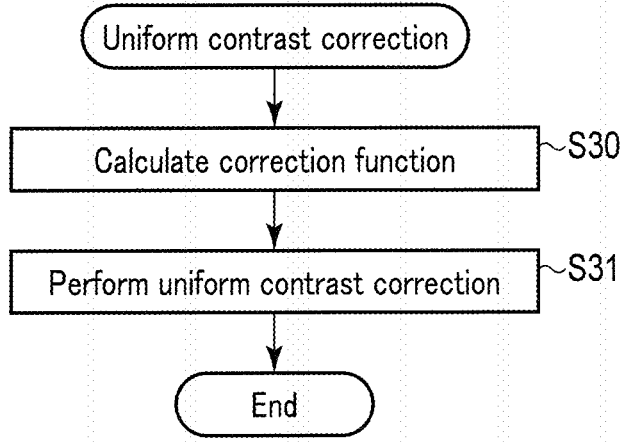
FIG. 12 is a flowchart illustrating a uniform contrast correction operation performed by the imaging apparatus.

The contrast correction is performed for each of the pixels, using correction coefficients gain R', gain G' and gain B' which are adjusted by weighting. The contrast correction is performed for each of the pixels according to formulas (10) to (12).

Where the second correction system (second mist correction unit 111) is selected as a result of the correction system determination, the second mist correction unit 111 performs uniform gradation correction for the entire image, according to the uniform contrast correction operation flowchart shown in FIG. 12.

Based on the digital image signal supplied from the mist distribution estimation unit 109, the correction function calculator 400 of the second mist correction unit 111 calculates a correction function for contrast correction (step S30). For example, the correction function is calculated based on brightness histograms of the entire image and includes a linear function, a nonlinear function or a broken line approximation function. The correction function calculator 400 supplies information on a calculated correction function to the uniform contrast correction unit 401.

Based on the correction function supplied from the correction function calculator 400, the uniform contrast correction unit 401 performs contrast correction for the digital image signal (step S31). To be more specific, the uniform contrast correction unit 401 determines a correction function for contrast correction from the brightness and color signals of the input image I of the digital image signal supplied from the mist distribution estimation unit 109, and performs uniform contrast correction for the entirety of the input image I, using the determined correction function.

In step S7, the compression unit 112 performs such known compression processing as JPEG and MPEG for a digital image signal supplied from the first mist correction unit 110 or second mist correction unit 111, and supplies the resultant compressed signal to the output unit 113.

In step S8, the output unit 113 stores the compressed digital image signal supplied thereto from the compression unit 112, in a memory card or the like. The output unit 113 may cause the compressed digital image signal supplied from the compression unit 112 to be shown on a display provided independently.

As described above, according to the first embodiment, the distribution of the mist component H(x, y) in the entire image is obtained first of all. Where the distribution of the mist component H(x, y) is wide, it is assumed that the image includes a mist region, and adaptive contrast correction is performed. Where the distribution of the mist component H(x, y) is narrow, it is assumed that the entire image is in mist, and the uniform contrast correction is performed. For example, the uniform contrast correction is performed for such an image as is shown in FIG. 4A, i.e., an image in which the entirety is uniformly in mist and the values of the mist component H(x, y) are distributed in a narrow range. The adaptive contrast correction is performed for such an image as is shown in FIG. 4B, i.e., an image which includes both a mist region and a non-mist region and the values of the mist component H(x, y) are distributed in a wide range. Thanks to these features, contrast correction can be performed only for a mist region. As described above, an image can be improved in visibility without giving rise to unnaturalness and can be made to have high quality, by estimating the density of the mist component and performing suitable gradation correction in accordance with how the mist component is distributed in the image.

The adaptive contrast correction unit 301 maintains the original values of the correction coefficients gain R, gain G and gain B for a dense mist region of the input image I, i.e., a region having a high brightness and a low saturation, and adjusts the correction coefficients gain R, gain G and gain B to be close to 1.0 for a light mist region of the input image I, i.e., a region having a low brightness or a high saturation. In this manner, the contrast of a region whose contrast is lowered by the mist can be emphasized in accordance with how the density of the mist is.

Modification of First Embodiment

Figure 13:
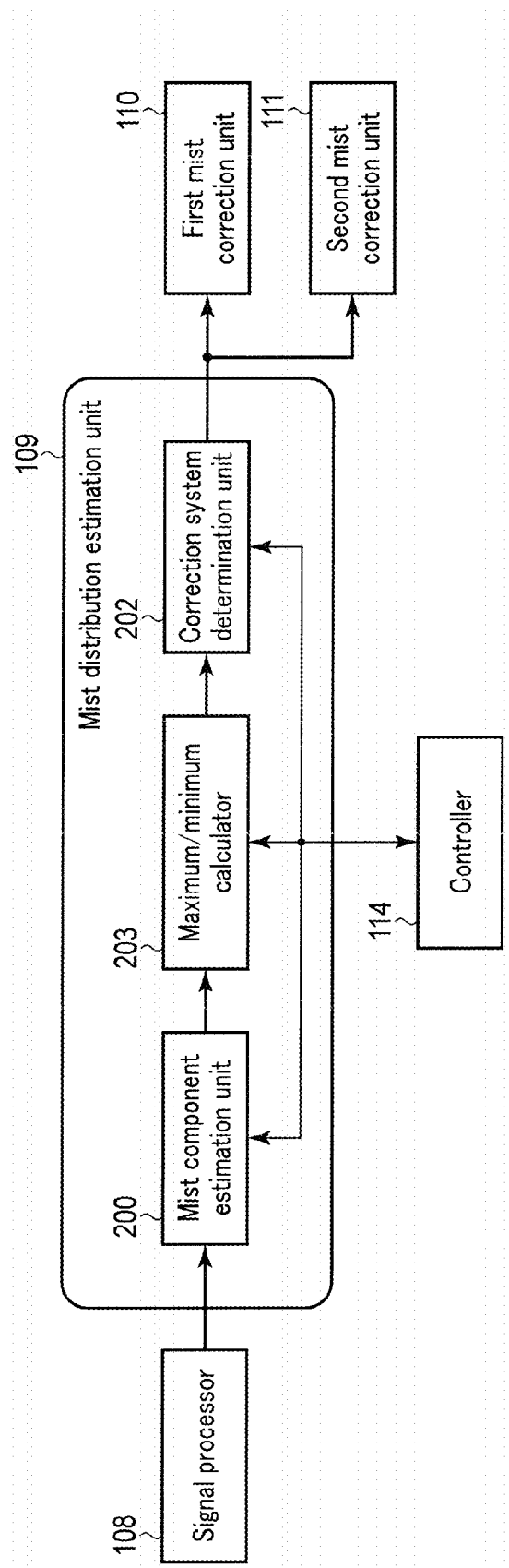
FIG. 13 is a block diagram illustrating a modification of the mist distribution estimation unit of the imaging apparatus.

A modification of the first embodiment of the present invention will now be described with reference to the accompanying drawings. The modification differs from the above-mentioned first embodiment in terms of the internal configuration of the mist distribution estimation unit 109. In FIG. 13, like reference numerals denote like parts in FIG. 2, and a detailed description of such parts will be omitted.

FIG. 13 is a block diagram illustrating the mist distribution estimation unit 109. The mist distribution estimation unit 109 employs a maximum/minimum calculator 203 in place the mist histogram generator 201 mentioned above. A correction system determination unit 202 is connected to a mist component estimation unit 200 by way of the maximum/minimum calculator 203. A controller 114 exchanges signals with the maximum/minimum calculator 203 and controls the maximum/minimum calculator 303.

The maximum/minimum calculator 203 calculates a maximal value and a minimal value which the mist component H(x, y) supplied from the mist component estimation unit 200 takes on in the entire image, and supplies the maximal value and the minimal value of the mist component H(x, y) to the correction system determination unit 202.

The correction system determination unit 202 determines a correction system to be used, based on the difference or ratio between the maximal value and minimal value supplied from the maximum/minimum calculator 203. In other words, the correction system determination unit 202 determines which correction unit, the first mist correction unit 110 or the second mist correction unit 111, should be used for mist correction.

To be more specific, the correction system determination unit 202 calculates the difference or ratio between the maximal and minimal values of the mist component H(x, y). If the difference or ratio is large, the correction system determination unit 202 determines that the image is such an image as is shown in FIG. 4B, i.e., an image which includes both a mist region and a non-mist region and the values of the mist component H(x, y) are distributed in a wide range. Based on this determination, the first correction system (first mist correction unit 110) is selected to perform adaptive contrast correction with respect to the image.

The correction system determination unit 202 calculates the difference or ratio between the maximal and minimal values of the mist component H(x, y). If the difference or ratio is small, the correction system determination unit 202 determines that the image is such an image as is shown in FIG. 4A, i.e., an image in which the entirety is uniformly in mist and the values of the mist component H(x, y) are distributed in a narrow range. Based on this determination, the second correction system (second mist correction unit 111) is selected to perform uniform contrast correction with respect to the image.

Whether the difference or ratio between the maximal and minimal values of the mist component H(x, y) is large or small can determined by comparing the difference or ratio with a predetermined threshold (predetermined value).

As described above, according to the modification of the first embodiment, the selection of either the first mist correction unit 110 or the second mist correction unit 111 for the mist correction is made based on the value of the difference or ratio between the maximal and minimal values which the mist component H(x, y) takes on in the entire image. Thanks to this feature, a determination can be made whether the image is such an image as is shown in FIG. 4A, i.e., an image in which the entirety is uniformly in mist and the values of the mist component H(x, y) are distributed in a narrow range or such an image as is shown in FIG. 4B, i.e., an image which includes both a mist region and a non-mist region and the values of the mist component H(x, y) are distributed in a wide range. In this manner, whether to perform adaptive contrast correction (first mist correction unit 110) or to perform uniform contrast correction (second mist correction portion 111) can be selected based on the property of the image.

Second Embodiment

Figure 14:
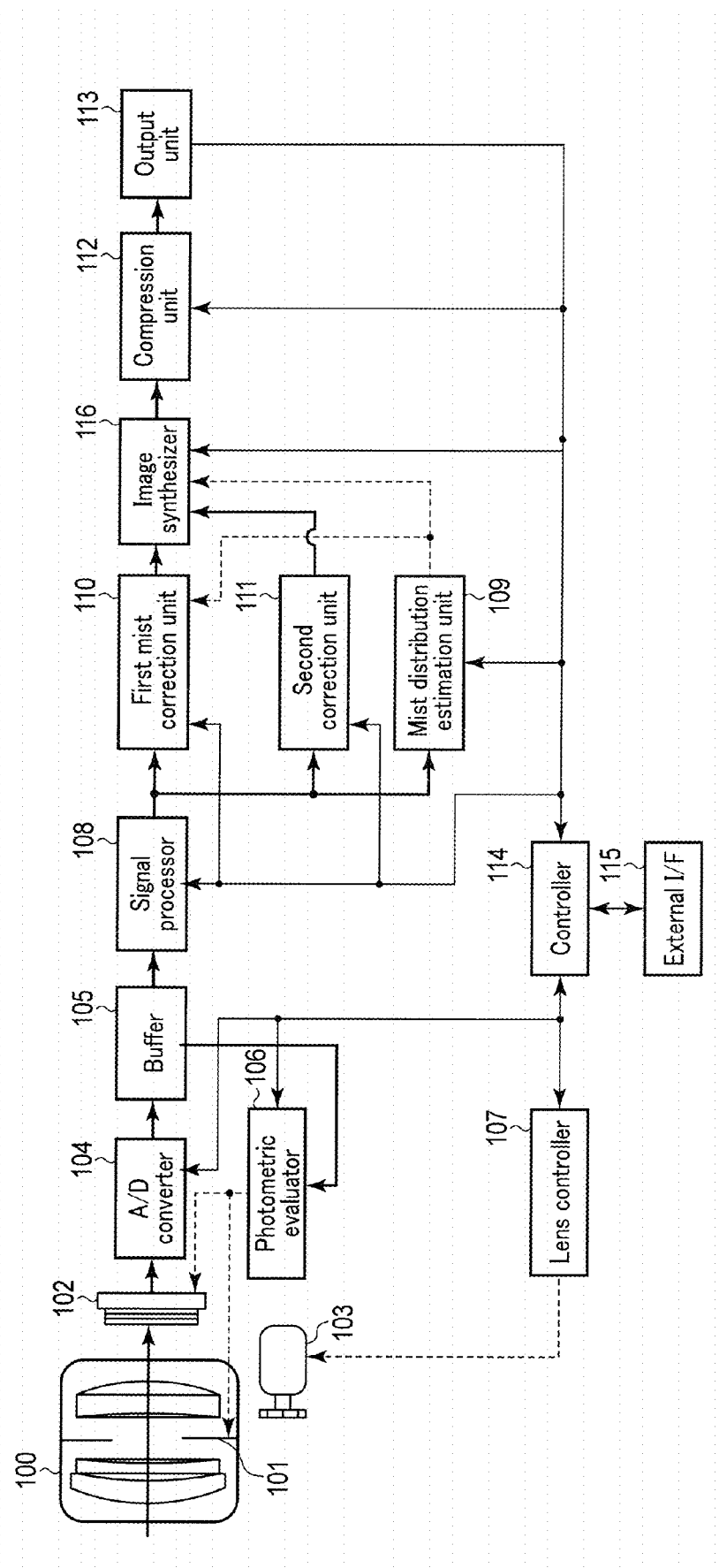
FIG. 14 is a block diagram illustrating an imaging apparatus to which an image processing apparatus according to the second embodiment of the present invention is applied.

The second embodiment of the present invention will now be described with reference to the accompanying drawings. In FIG. 14, like reference numerals denote like parts in FIG. 1, and a detailed description of such parts will be omitted.

FIG. 14 is a block diagram illustrating an imaging apparatus to which an image processing apparatus is applied. In the imaging apparatus, a first mist correction unit 110, a second mist correction unit 111 and a mist distribution estimation unit 109 are arranged in parallel and connected to the output terminal of a signal processor 108. The first mist correction unit 110, the second mist correction unit 111 and the mist distribution estimation unit 109 are connected to an image synthesizer 116. A compression unit 112 is connected to the image synthesizer 116.

The mist distribution estimation unit 109 estimates the mist component H(x, y) at each pixel, based on the digital image signal supplied from the signal processor 108. The mist distribution estimation unit 109 estimates the distribution of the mist component in accordance with how the mist component H(x, y) is distributed in the entire image, and further calculates a weight coefficient to be used in the image synthesizer 116, based on the estimated distribution of the mist component H(x, y). The mist distribution estimation unit 109 supplies the estimated mist component H(x, y) of each pixel to the first mist correction unit 110, and supplies the calculated weight coefficient to the image synthesizer 116.

Figure 15:
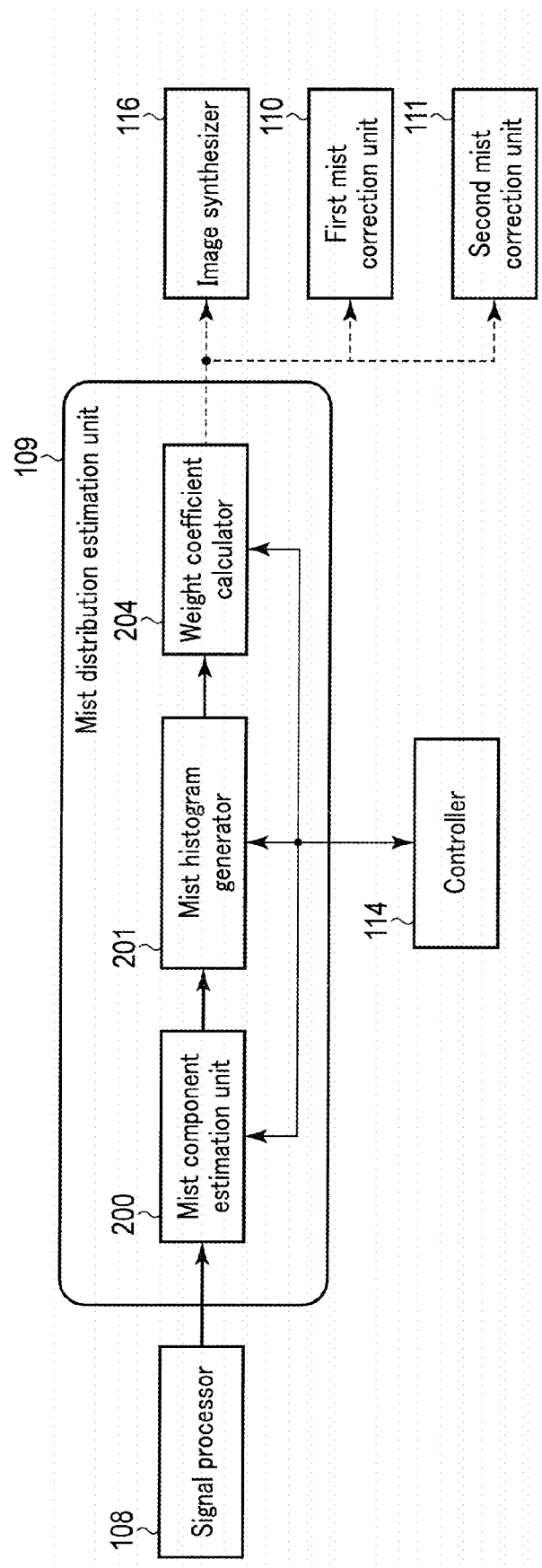
FIG. 15 is a block diagram illustrating the mist distribution estimation unit of the imaging apparatus.

FIG. 15 is a diagram illustrating a configuration of the mist distribution estimation unit 109. The mist distribution estimation unit 109 employs a weight coefficient calculator 204 in place the correction system determination unit 202 mentioned above. The mist distribution estimation unit 109 is provided with a mist component estimation unit 200. The weight coefficient calculator 204 is connected to the mist component estimation unit 200 by way of a mist histogram generator 201. The controller 114 exchanges signals not only with the mist component estimation unit 200 and mist histogram. generator 201 but also with the weight coefficient calculator 204, and controls the weight coefficient calculator 204.

As in the foregoing embodiment, the mist component estimation unit 200 receives a digital image signal from the signal processor 108, and estimates the mist component H(x, y) at each pixel based on the R value, G value and B value of the pixel of the coordinates (x, y) obtained from the digital image signal.

As in the foregoing embodiment, the mist histogram generator 201 counts the frequency of appearance of each value of the mist component H(x, y) supplied from the mist component estimation unit 200, and generates histograms of the mist component H(x, y), such as those shown in FIGS. 4A and 4B. The mist histogram generator 201 not only generates histograms of the mist component H(x, y) but also obtains a standard deviation σ, an average value a, the difference between a maximal value and a minimal value, the ratio between the maximal value and the minimal value, etc. from the histograms.

The weight coefficient calculator 204 calculates a weight coefficient w to be used in the image synthesis processing performed by the image synthesizer 116, based on information on the histograms of the mist component H(x, y) supplied from the mist component estimation unit 200. The weight coefficient calculator 204 calculates such a weight coefficient as is shown in FIG. 16, i.e., a weight coefficient which becomes closer to 1.0 in accordance with an increase in the ΔH of the distribution (abscissa axis) of the histograms of the mist component H(x, y). The calculation is carried out according to the following formula (13).

$$w = a \cdot \Delta H + b \quad (13)$$

where a and b are coefficients used for the calculation of the weight coefficient w, and ΔH is the dimension (0 to 255) of the histogram distribution of the mist component H(x, y). FIG. 17 is a graph in which the weight coefficient w (=a·ΔH+b) is plotted.

If the dimension ΔH of the histogram distribution of the mist component H(x, y) supplied from the mist component estimation unit 200 takes on a large value and the image is very likely to include both a mist region and a non-mist region, as shown in FIG. 4B, then the weight coefficient calculator 204 calculates a large weight coefficient w, for example, a weight coefficient of 0.5 or more (first weight coefficient) with respect to the correction result of the first mist correction unit 110 (which performs adaptive contrast correction).

If the dimension ΔH of the histogram distribution of the mist component H(x, y) supplied from the mist component estimation unit 200 takes on a small value, and the image is determined to be an image in which the entirely is in uniform mist and the mist component H(x, y) is distributed within a narrow range, as shown in FIG. 4B, then the weight coefficient calculator 204 calculates a small weight coefficient w, for example, a weight coefficient less than 0.5 (second weight coefficient) with respect to the correction result of the second mist correction unit 111 (which performs uniform contrast correction).

The weight value (w) calculation formula (13) describes a linear function, but this is not restrictive. For example, a formula describing a non-linear function or a formula describing a broken line approximation function may be used.

Although ΔH is used as an index representing the range of the histogram distribution, this is not restrictive. For example, the range of the histogram distribution can be expressed based on the ratio between the maximal and minimal values of the histogram distribution.

The image synthesizer 116 adds a digital image signal supplied from the first mist correction unit 110 and a digital image signal supplied from the second mist correction unit 111, based on the weight coefficient w supplied from the mist distribution estimation unit 109.

Figure 18:
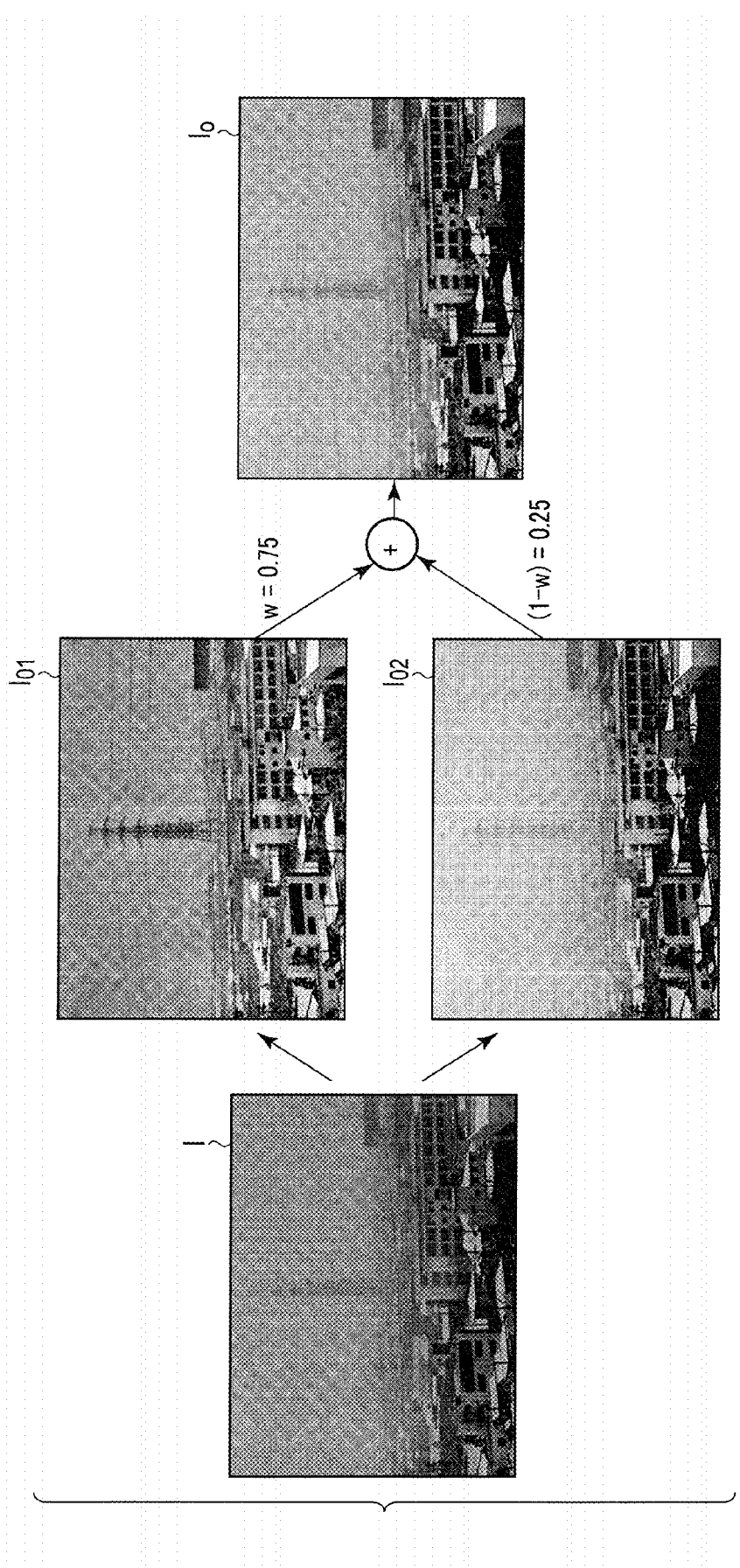
FIG. 18 illustrates a concept underlying the image synthesis processing performed by an image synthesizer.

FIG. 18 illustrates a concept underlying the image synthesis processing performed by the image synthesizer 116. Based on the weight coefficient w calculated by the weight coefficient calculator 204, the image synthesizer 116 adds image IO1 and image IO2 to each other. Image IO1 is an image to which the weighting (w=0.75) corresponding to the adaptive contrast correction performed by the first mist correction unit 110 is applied, and image IO2 is an image to which the weighting (1−w=0.25) corresponding to the uniform contrast correction performed by the second mist correction unit 111 is applied. The image synthesis is carried out according to formula (14) set forth below. An output image Io obtained after the image synthesis is given by:

$$Io = w \cdot IO1 + (1-w) \cdot IO2 \quad (14)$$

where IO1 denotes an image obtained after adaptive contrast correction is performed, and IO2 is an image obtained after uniform contrast correction is performed.

Figure 19:
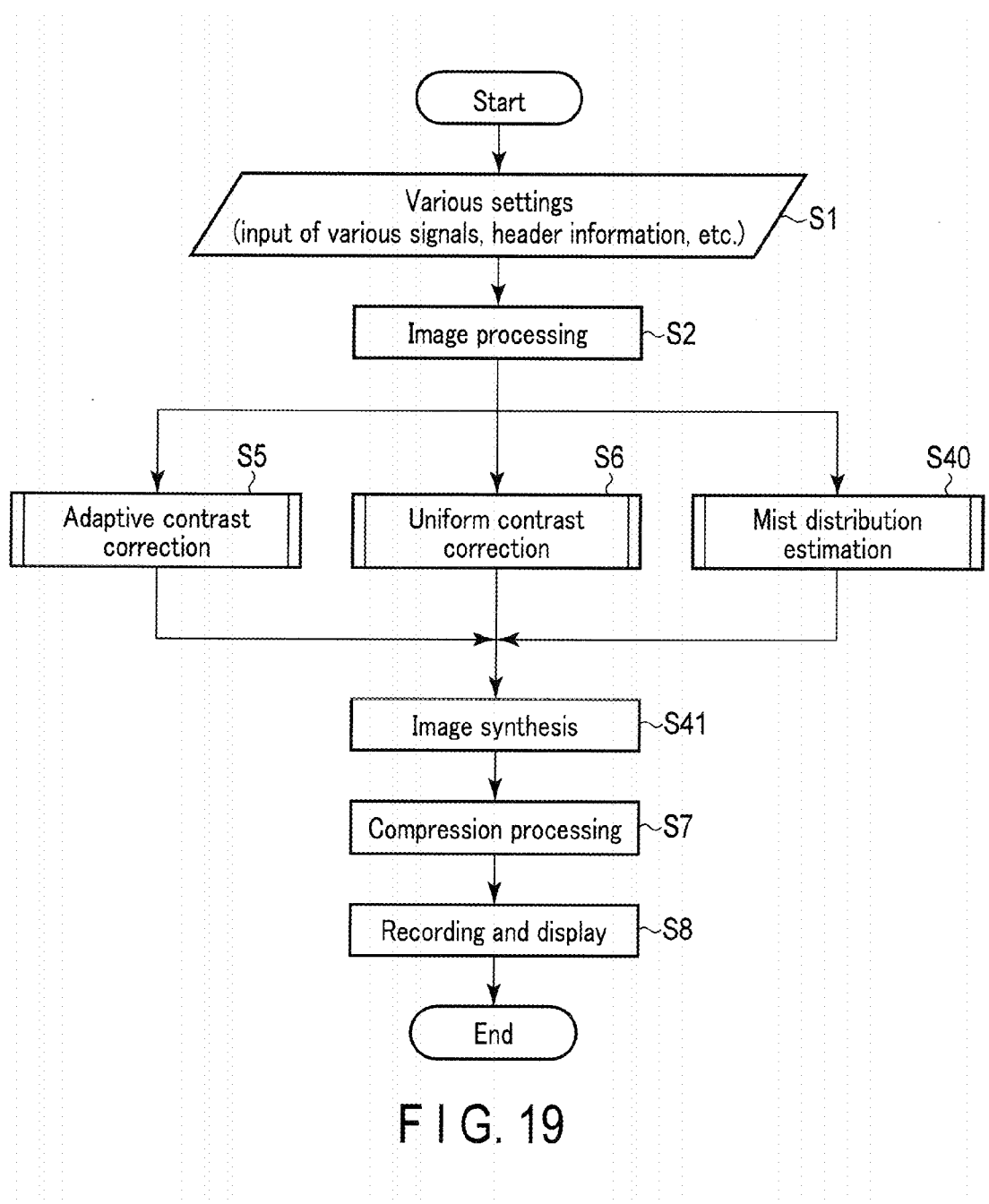
FIG. 19 is a flowchart illustrating a photographing operation performed by the imaging apparatus.

Next, the photographing operation of the imaging apparatus having the above-mentioned configuration will be described with reference to the photographing operation flowchart shown in FIG. 19.

In step S40, the mist distribution estimation unit 109 estimates the mist component H(x, y) at each pixel, based on the digital image signal supplied from the signal processor 108. The mist distribution estimation unit 109 estimates the distribution of the mist component in accordance with how the mist component H(x, y) is distributed in the entire image, and further calculates a weight coefficient to be used in the image synthesizer 116, based on the estimated distribution of the mist component H(x, y). The mist distribution estimation unit 109 supplies the estimated mist component H(x, y) of each pixel to the first mist correction unit 110, and supplies the calculated weight coefficient to the image synthesizer 116.

To be specific, the mist distribution estimation unit 109 estimates mist distribution according to the mist distribution estimation flowchart shown in FIG. 20. As in the foregoing embodiment, the mist component estimation unit 200 receives a digital image signal from the signal processor 108, and estimates the mist component H(x, y) at each pixel based on the R value, G value and B value of the pixel of the coordinates (x, y) obtained from the digital image signal (step S50).

In step S51, the mist histogram generator 201 counts the frequency of appearance of each value of the mist component H(x, y) supplied from the mist component estimation unit 200, and generates histograms of the mist component H(x, y), such as those shown in FIGS. 4A and 4B. The mist histogram generator 201 not only generates the histograms of the mist component H(x, y) but also obtains a standard deviation σ, an average value a, the difference between a maximal value and a minimal value, the ratio between the maximal value and the minimal value, etc. from the histogram.

In step S52, the weight coefficient calculator 204 calculates a weight coefficient w to be used in the image synthesis processing performed by the image processor 116, based on information on the histograms of the mist component H(x, y) supplied from the mist component estimation unit 201. The weight coefficient w is calculated according to formula (13) set forth above. The weight coefficient w becomes closer to 1.0 in accordance with an increase in the dimension ΔH of the distribution of the histograms of the mist component H(x, y), as shown in FIG. 16.

To be more specific, if the dimension ΔH of the histogram distribution of the mist component H(x, y) supplied from the mist component estimation unit 201 takes on a large value and the image is very likely to include both a mist region and a non-mist region, as shown in FIG. 4B, then the weight coefficient calculator 204 calculates a large weight coefficient w (e.g., a weight coefficient of 0.5 or more) with respect to the correction result of the first mist correction unit 110 (which performs adaptive contrast correction).

If the dimension ΔH of the histogram distribution of the mist component H(x, y) supplied from the mist histogram generator 201 takes on a small value, and the image is determined to be an image in which the entirety is in uniform mist and the values of the mist component H(x, y) are distributed in a narrow range, as shown in FIG. 4A, then the weight coefficient calculator 204 calculates a small weight coefficient w (e.g., a weight coefficient smaller than 0.5) with respect to the correction result of the first mist correction unit 110 (which performs adaptive contrast correction).

In Step S5, the first mist correction unit 110 performs adaptive contrast correction according to the adaptive contrast correction operation flowchart shown in FIG. 11. The first mist correction unit 110 performs adaptive contrast correction for the digital image signal supplied from the signal processor 108 such that the contrast of a low-contrast portion caused by the mist is emphasized. This adaptive contrast correction is performed for each pixel in accordance with the value of the mist component H(x, y) supplied from the mist component estimation unit 200. The first mist correction unit 110 supplies the digital image signal subjected to the adaptive contrast correction to the image synthesizer 116.

In step S6, the second mist correction unit 111 performs uniform contrast correction for the digital image signal supplied from the signal processor 108, according to the uniform contrast correction operation flowchart shown in FIG. 12. The second mist correction unit 111 supplies the digital image signal subjected to the uniform contrast correction to the image synthesizer 116.

In step S41, the image synthesizer 116 adds image IO1 and image IO2 to each other and obtains a synthesized image Io, as shown in FIG. 18. Image IO1 is an image for which the adaptive contrast correction is performed by the first mist correction unit 110, and image IO2 is an image for which the uniform contrast correction is performed by the second mist correction unit 111. The image synthesis is carried out by performing calculation based on the weight coefficient w and according to formula (14).

In step S7, the compression unit 112 performs such known compression processing as JPEG and MPEG for a digital image signal supplied from the image synthesizer 116, and supplies the resultant compressed signal to the output unit 113. Instep S8, the output unit 113 stores the compressed digital image signal supplied thereto from the compression unit 112, in a memory card or the like. The output unit 113 may cause the compressed digital image signal supplied from the compression unit 112 to be shown on a display provided independently.

According to the second embodiment, if the dimension ΔH of the histogram distribution of the mist component H (x, y) takes on a large value and the image is very likely to include both a mist region and a non-mist region, as shown in FIG. 4B, then the weight coefficient calculator 204 multiplies the result of the adaptive contrast correction by a large weight coefficient w and multiplies the result of the uniform contrast correction by a small coefficient value (1−w).

If the dimension ΔH of the histogram distribution of the mist component H(x, y) takes on a small value, and the image is determined to be an image in which the entirety is in uniform mist and the values of the mist component H(x, y) of the entire image are distributed in a narrow range, as shown in FIG. 4A, then the weight coefficient calculator 204 multiplies the result of the adaptive contrast correction by a small weight coefficient w and multiplies the result of the uniform contrast correction by a large coefficient value (1−w).

In this manner, an image subjected to the adaptive contrast correction and an image subjected to the uniform contrast correction are synthesized, and the image obtained thereby is improved in visibility, does not look unnatural, and is of high quality.

The present invention is not limited to the above embodiments and may be modified as follows:

In the above embodiments, the mist component H(x, y), which is processed as a degree of degradation, includes a fog component and a white component.

In the above embodiments, processing is executed by hardware, but this is not restrictive. For example, a digital image signal output from the signal processor 108 may be processed by software.

In the above embodiments, the mist component estimation and the correction coefficient calculation are performed for each of the pixels of a digital image signal received from the signal processor 108, but this is not restrictive. For example, the digital image signal can be first reduced in size, and then the mist component estimation and the correction coefficient calculation may be performed for such a reduced digital image signal.

When the mist component estimation and the correction coefficient calculation are performed for a reduced image, the mist component and the correction coefficient are enlarged to the original size at the time of contrast correction by performing known interpolation processing (such as bilinear interpolation or bicubic interpolation), and contrast correction can be performed using the mist component and correction coefficient.

The present invention is not limited to the embodiments described above, and can be modified in various manners in practice without departing from the gist of the invention. In addition, various inventions can be made by properly combining the structural elements disclosed in connection with the embodiments. For example, some of the structural elements may be deleted from each of the embodiments. Furthermore, structural elements of different embodiments may be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a degree-of-degradation detector which detects a degree of degradation from values of color channels in each of areas including a pixel of interest in image data, the degree of degradation indicating an unclearness in each of the areas, and the image data comprising pieces of pixel data including the color channels;
a degree-of-degradation estimation unit which estimates a dispersion of the degree of degradation in the image data;
a correction system selector which selects either a first gradation correction system or a second gradation correction system in accordance with the dispersion of the degree of degradation; and
a gradation correction unit which performs gradation correction of the image data based on either the selected first or second gradation correction system, wherein
the first gradation correction system performs adaptive gradation correction based on the degree of degradation of each of the areas of the image data,
the second gradation correction system performs uniform gradation correction for entirety of the image data, and
the correction system selector selects the first gradation correction system when the dispersion of the degree of degradation is equal to or more than a predetermined value, and selects the second gradation correction system when the dispersion of the degree of degradation is less than the predetermined value.

2. The image processing apparatus according to claim 1, wherein the degree-of-degradation estimation unit includes a degree-of-degradation histogram generator which generates a histogram of the degree of degradation, and
the dispersion of the degree of degradation includes a dimension of a distribution of the histogram of the degree of degradation.

3. The image processing apparatus according to claim 2, wherein the dimension of a distribution of the histogram of the degree of degradation includes at least one of a standard deviation of the histogram of the degree of degradation, a difference between maximal and minimal values of the histogram of the degree of degradation, or a ratio between the maximal and minimal values of the histogram of the degree of degradation.

4. The image processing apparatus according to claim 1, wherein the degree-of-degradation estimation unit includes a maximum/minimum calculator which calculates a maximal value and a minimal value of the degree of degradation in entirety of the image data; and
the dimension of a distribution of the histogram of the degree of degradation includes a difference between the maximal value and the minimal value or a ratio between the maximal value and the minimal value.

5. The image processing apparatus according to claim 1, wherein the first correction system includes a correction coefficient calculator which calculates a correction coefficient for gradation correction, for each of the small areas of the image data, and
an adaptive contrast correction unit which adjusts the correction coefficient based on the degree of degradation and performs the adaptive gradation correction.

6. The image processing apparatus according to claim 1, wherein the second gradation correction system performs the uniform gradation correction for the entirety of the image, based on a correction function determined by a distribution of a brightness signal of the image and/or a distribution of a color signal of the image.

7. An image processing apparatus comprising:
a degree-of-degradation detector which detects a degree of degradation from values of color channels in each of areas including a pixel of interest in image data, the degree of degradation indicating an unclearness in each of the areas, and the image data comprising pieces of pixel data including the color channels;
a degree-of-degradation estimation unit which estimates a dispersion of the degree of degradation in the image data;
a first gradation correction unit which performs gradation correction for the image data based on a first gradation correction system, the first gradation correction system performing adaptive gradation correction based on the degree of degradation of each of the areas of the image data;
a second gradation correction unit which performs gradation correction for the image data based on a second gradation correction system, the second gradation correction system performing uniform gradation correction for entirety of the image data;
a weight coefficient calculator which calculates a weight coefficient corresponding to a dimension of the dispersion of the degree of degradation; and
an image synthesizer which adds first correction image data generated by the first correction unit and second correction image data generated by the second correction unit, based on the weight coefficient, wherein
the weight coefficient calculator determines a first weight coefficient and a second weight coefficient, the first weight being a weight coefficient that increases in accordance with an increase in the dimension of the dispersion of the degree of degradation, and the second weight coefficient being a weight coefficient that decreases in accordance with a decrease in the dimension of the dispersion of the degree of degradation, and
the image synthesizer multiplies the first correction image data by the first weight coefficient, multiplies the second correction image data by the second weight coefficient, and adds the first correction image data and the second correction image data to each other after multiplication.

8. An image processing method comprising:
detecting a degree of degradation from values of color channels in each of areas including a pixel of interest in image data, the degree of degradation indicating an unclearness in each of the areas, and the image data comprising pieces of pixel data including the color channels;
estimating a dispersion of the degree of degradation in the image data;

selecting either a first gradation correction system or a second gradation correction system in accordance with the dispersion of the degree of degradation; and
performing gradation correction for the image data based on either the selected first or second gradation correction system, wherein
the first gradation correction system performs adaptive gradation correction based on the degree of degradation of each of the areas of the image data,
the second gradation correction system performs uniform gradation correction for entirety of the image data, and
the first gradation correction system is selected when the dispersion of the degree of degradation is equal to or more than a predetermined value, and the second gradation correction system is selected when the dispersion of the degree of degradation is less than the predetermined value.

9. An image processing method comprising:
detecting a degree of degradation from values of color channels in each of areas including a pixel of interest in image data, the degree of degradation indicating an unclearness in each of the areas, and the image data comprising pieces of pixel data including the color channels;
estimating a dispersion of the degree of degradation in the image data;
performing gradation correction for the image data based on a first gradation correction system, the first gradation correction system performing adaptive gradation correction based on the degree of degradation of each of the areas of the image data;
performing gradation correction for the image data based on a second gradation correction system, the second gradation correction system performing uniform gradation correction for entirety of the image data;
calculating a weight coefficient corresponding to a dimension of the dispersion of the degree of degradation; and
adding first correction image data generated based on the first correction system and second correction image data generated based on the second correction system, based on the weight coefficient, wherein
a first weight coefficient and a second weight coefficient is determined as the weight coefficient, the first weight being a weight coefficient that increases in accordance with an increase in the dimension of the dispersion of the degree of degradation, and the second weight coefficient being a weight coefficient that decreases in accordance with a decrease in the dimension of the dispersion of the degree of degradation, and
the first correction image data is multiplied by the first weight coefficient, the second correction image data is multiplied by the second weight coefficient, and the first correction image data and the second correction are added each other after multiplication.

10. A non-transitory recording medium storing an image processing program readable by a computer, the image processing program comprising:
a degree-of-degradation detection function of detecting a degree of degradation from values of color channels in each of areas including a pixel of interest in image data, the degree of degradation indicating an unclearness in each of the areas, and the image data comprising pieces of pixel data including the color channels;
a degree-of-degradation estimation function of estimating a dispersion of the degree of degradation in the image data;

a correction system selection function of selecting either a first gradation correction system or a second gradation correction system in accordance with the dispersion of the degree of degradation; and a gradation correction function of performing gradation correction for the image data based on either the selected first or second gradation correction system, wherein the first gradation correction system performs adaptive gradation correction based on the degree of degradation of each of the areas of the image data, the second gradation correction system performs uniform gradation correction for entirety of the image data, and the correction system selection function selects the first gradation correction system when the dispersion of the degree of degradation is equal to or more than a predetermined value, and selects the second gradation correction system when the dispersion of the degree of degradation is less than the predetermined value.

11. A non-transitory recording medium storing an image processing program readable by a computer, the image processing program comprising:

a degree-of-degradation detection function of detecting a degree of degradation from values of color channels in each of areas including a pixel of interest in image data, the degree of degradation indicating an unclearness in each of the areas, and the image data comprising pieces of pixel data including the color channels;

a degree-of-degradation estimation function of estimating a dispersion of the degree of degradation in the image data;

a first gradation correction function of performing gradation correction for the image data based on a first gradation correction system, the first gradation correction system performing adaptive gradation correction based on the degree of degradation of each of the areas of the image data;

a second gradation correction function of performing gradation correction for the image data based on a second gradation correction system, the second gradation correction system performing uniform gradation correction for entirety of the image data;

a weight coefficient calculation function of calculating a weight coefficient corresponding to a dimension of the dispersion of the degree of degradation; and an image synthesis function of adding first correction image data generated based on the first correction system and second correction image data generated based on the second correction system, based on the weight coefficient, wherein the weight coefficient calculation function determines a first weight coefficient and a second weight coefficient, the first weight being a weight coefficient that increases in accordance with an increase in the dimension of the dispersion of the degree of degradation, and the second weight coefficient being a weight coefficient that decreases in accordance with a decrease in the dimension of the dispersion of the degree of degradation, and the image synthesis function multiplies the first correction image data by the first weight coefficient, multiplies the second correction image data by the second weight coefficient, and adds the first correction image data and the second correction image data to each other after multiplication.

12. An imaging apparatus comprising:

an imaging element which forms an optical image of an object;

an image processing apparatus according to claim 1, the image processing apparatus detecting a degree of degradation of image quality of image data acquired from the optical image formed by the imaging element, and correcting the image data in accordance with the degree of degradation; and an output unit which outputs the image data subjected to image processing by the image processing apparatus.

* * * * *